United States Patent
Yoshida et al.

(10) Patent No.: US 8,946,339 B2
(45) Date of Patent: Feb. 3, 2015

(54) MODIFIED CONJUGATED DIENE-BASED POLYMER, METHOD FOR PRODUCING THE SAME, MODIFIED CONJUGATED DIENE-BASED POLYMER COMPOSITION, AND TIRE

(75) Inventors: Junichi Yoshida, Chiyoda-ku (JP);
Shinichi Sekikawa, Chiyoda-ku (JP);
Ryoko Fukuoka, Chiyoda-ku (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 592 days.

(21) Appl. No.: 13/120,213

(22) PCT Filed: Oct. 13, 2009

(86) PCT No.: PCT/JP2009/005331
§ 371 (c)(1),
(2), (4) Date: Mar. 22, 2011

(87) PCT Pub. No.: WO2010/044252
PCT Pub. Date: Apr. 22, 2010

(65) Prior Publication Data
US 2011/0172344 A1    Jul. 14, 2011

(30) Foreign Application Priority Data

Oct. 14, 2008 (JP) ................................. 2008-265434
Aug. 11, 2009 (JP) ................................. 2009-186603

(51) Int. Cl.
| | | |
|---|---|---|
| C08L 9/06 | (2006.01) | |
| C08F 36/14 | (2006.01) | |
| C08F 8/42 | (2006.01) | |
| C08K 3/36 | (2006.01) | |
| C08L 9/00 | (2006.01) | |
| B60C 1/00 | (2006.01) | |
| C08C 19/44 | (2006.01) | |
| C08F 36/04 | (2006.01) | |
| C08L 15/00 | (2006.01) | |
| C08L 7/00 | (2006.01) | |

(52) U.S. Cl.
CPC ... *C08L 9/00* (2013.01); *B60C 1/00* (2013.01); *C08C 19/44* (2013.01); *C08F 36/04* (2013.01); *C08L 15/00* (2013.01); *C08K 3/36* (2013.01); *C08L 7/00* (2013.01)
USPC ............................ 524/493; 524/572; 525/102

(58) Field of Classification Search
None
See application file for complete search history.

(56) References Cited

U.S. PATENT DOCUMENTS

| | | |
|---|---|---|
| 4,482,677 A | 11/1984 | Teranaka et al. |
| 5,508,333 A | 4/1996 | Shimizu |
| 6,506,829 B1 | 1/2003 | Materne et al. |
| 6,969,739 B1 | 11/2005 | Saito et al. |
| 7,915,349 B2 | 3/2011 | Yamada et al. |
| 2003/0199669 A1 | 10/2003 | Saito et al. |
| 2004/0254301 A1 | 12/2004 | Tsukimawashi et al. |
| 2008/0194760 A1 | 8/2008 | Hochi |
| 2009/0111933 A1 | 4/2009 | Yamada et al. |
| 2009/0163668 A1 | 6/2009 | Yamada et al. |
| 2009/0203843 A1 | 8/2009 | Fukuoka et al. |
| 2009/0292043 A1 | 11/2009 | Kurazumi et al. |

FOREIGN PATENT DOCUMENTS

| | | |
|---|---|---|
| EP | 1 153 972 A1 | 11/2001 |
| EP | 1 865 023 A1 | 12/2007 |
| EP | 1 942 120 A1 | 7/2008 |
| JP | 57-40513 | 3/1982 |
| JP | 59-140211 | 8/1984 |
| JP | 2-229809 | 9/1990 |
| JP | 07-233217 | 9/1995 |
| JP | 2001-158834 | 6/2001 |
| JP | 2003-171418 | 6/2003 |
| JP | 2006-257261 | 9/2006 |
| JP | 2006-306962 | 11/2006 |
| JP | 2008-214608 | 9/2008 |
| JP | 2008-285558 | 11/2008 |
| WO | 01/23467 | 4/2001 |
| WO | 2006/112450 | 10/2006 |
| WO | 2007/034785 | 3/2007 |
| WO | 2008-013090 | 1/2008 |
| WO | 2008/060621 | 5/2008 |

OTHER PUBLICATIONS

International Search Report for PCT/JP2009/005331 (in English and Japanese).
European Search Report issued with respect to counterpart European Application No. 09820430.8, dated Jul. 3, 2012.
International Preliminary Report on Patentability for PCT/JP2009/005331, mailed May 17, 2011.
Taiwanese Office Action issued with respect to counterpart Taiwanese Application No. 098134810, dated Dec. 6, 2012.
Japan Office action, mail date is Jun. 17, 2013.

*Primary Examiner* — Ling Choi
*Assistant Examiner* — Catherine S Branch
(74) *Attorney, Agent, or Firm* — Greenblum & Bernstein, P.L.C.

(57) ABSTRACT

There is provided a modified conjugated diene-based polymer having a silyl group substituted with one or more alkoxy groups, and one or more nitrogen atoms on the chain ends of a conjugated diene-based polymer, the modified conjugated diene-based polymer being obtained by polymerizing a conjugated diene compound, or copolymerizing a conjugated diene compound with an aromatic vinyl compound, by using a polyfunctional anionic polymerization initiator prepared from a polyvinyl aromatic compound and an organolithium compound in a range of a molar ratio (the polyvinyl aromatic compound/the organolithium compound) of from 0.05 to 1.0, so as to obtain the conjugated diene-based polymer, and by reacting a living polymer end of the conjugated diene polymer with the compound having a silyl group substituted with two or more alkoxy groups, and one or more nitrogen atoms.

19 Claims, No Drawings

MODIFIED CONJUGATED DIENE-BASED POLYMER, METHOD FOR PRODUCING THE SAME, MODIFIED CONJUGATED DIENE-BASED POLYMER COMPOSITION, AND TIRE

TECHNICAL FIELD

The present invention relates to a modified conjugated diene-based polymer, a method for producing the same, a modified conjugated diene-based polymer composition, and a tire containing the composition.

BACKGROUND ART

Social request for environment protection, such as reduction of carbon dioxide emission, has increased a demand for automobile fuel efficiency.

In such a present situation, development of materials exhibiting low rolling resistance for automobile tires, particularly for tire tread which directly contacts with the ground, has been demanded.

On the other hand, from the viewpoint of the safety, materials which are excellent in wet skid resistance and which also have abrasion resistance and strength sufficient for practical use are required.

As reinforcing fillers for tire treads, carbon black, silica and the like are conventionally used.

Use of silica as a reinforcing filler has an advantage of achieving low hysteresis loss and improvement in the wet skid resistance.

On the other hand, in contrast to the hydrophobic nature of carbon black surface, silica surface is hydrophilic and has low affinity for conjugated diene-based rubbers, which causes poorer dispersibility of silica in conjugated diene-based rubber compounds than the carbon black. In order to improve the dispersibility and impart bonding between the silica and the rubbers, a silane coupling agent needs to be added.

In consideration of such problems with silica, attempts of introducing functional groups having affinity and/or reactivity to silica to the polymer chain end have been made. By introducing functional groups to the chain ends which have high mobility, the hysteresis loss can be reduced by improving the dispersibility of silica in conjugated diene-based rubber compounds and further, by reducing the number of free polymer chain ends via interaction with the filler particles.

For example, there are proposed a modified diene-based rubber obtained by reacting a modifier having a glycidylamino group with a polymer chain end (for example, see Patent Document 1), a modified diene-based rubber obtained by reacting glycidoxyalkoxysilane with a polymer chain end (for example, see Patent Document 2), further a modified diene-based rubber obtained by reacting an alkoxysilane containing an amino group with a polymer chain end (for example, see Patent Documents 3 and 4), and compositions thereof with silica.

A technology is also proposed in which a diene-based rubber is polymerized using a polyfunctional anionic polymerization initiator, and thereafter is modified with a modifier such as a glycidylamino group to increase the number of functionalized polymer chain ends, thereby improving the performance of a composition constituted of the diene-based rubber and silica, that is, the silica dispersibility, and reducing the hysteresis loss (for example, see Patent Document 5).

PRIOR ART DOCUMENTS

Patent Document

Patent Document 1: International Publication WO 01/23467
Patent Document 2: Japanese Patent Laid-Open No. 07-233217
Patent Document 3: Japanese Patent Laid-Open No. 2001-158834
Patent Document 4: Japanese Patent Laid-Open No. 2003-171418
Patent Document 5: Japanese Patent Laid-Open No. 2006-306962

SUMMARY OF INVENTION

Problems to be Solved by the Invention

However, in recent years, further fuel efficiency has been required and the development of rubber compositions with more reduced hysteresis loss has been demanded.

Objects of the present invention are to provide a modified conjugated diene-based polymer which, when made into a vulcanizate containing a silica-based inorganic filler, exhibits excellent balanced properties between the low hysteresis loss and properties regarding the safety such as wet skid resistance and low-temperature characteristics, has abrasion resistance and strength sufficient for practical use, and satisfies a good processability; a method for producing the same; a modified conjugated diene-based polymer composition; and a tire containing the composition.

Means for Solving the Problems

As a result of exhaustive studies to solve the above-mentioned problems with conventional technologies, the present inventors have found when a modified conjugated diene-based polymer obtained by polymerizing a conjugated diene compound optionally together with an aromatic vinyl compound using a specific polyfunctional anionic polymerization initiator, and modifying living polymer end with a compound having specific functional groups compounded with inorganic fillers, particularly a silica-based inorganic filler, and further vulcanized, the vulcanizate has an excellent balance between the low hysteresis loss and properties related to safety such as the wet skid resistance and the low-temperature characteristics, has abrasion resistance and strength sufficient for practical use, and satisfies a good processability. These findings have led to the completion of the present invention.

That is, the present invention is as follows.

[1]

A modified conjugated diene-based polymer having a silyl group substituted with one or more alkoxy groups, and one or more nitrogen atoms on the chain ends of the conjugated diene-based polymer, the modified conjugated diene-based polymer being obtained by polymerizing a conjugated diene compound, or copolymerizing a conjugated diene compound with an aromatic vinyl compound, by using a polyfunctional anionic polymerization initiator prepared from a polyvinyl aromatic compound and an organolithium compound in a range of a molar ratio (the polyvinyl aromatic compound/the organolithium compound) of from 0.05 to 1.0, so as to obtain the conjugated diene-based polymer, and by reacting a living polymer end of the conjugated diene-based polymer with a compound having a silyl group substituted with two or more alkoxy groups, and one or more nitrogen atoms.

[2]
The modified conjugated diene-based polymer according to item [1] described above, wherein a modification ratio determined by an amount adsorbed onto a column of gel permeation chromatography measurement using silica particle-packed column is 78% by mass or more.

[3]
The modified conjugated diene-based polymer according to item [1] or [2] described above, wherein a molar ratio of the polyvinyl aromatic compound to the organolithium compound is in a range of from 0.1 to 0.45.

[4]
The modified conjugated diene-based polymer according to any one of items [1] to [3] described above, wherein the compound having the silyl group substituted with two or more alkoxy groups, and one or more nitrogen atoms is represented by the following formula (1):

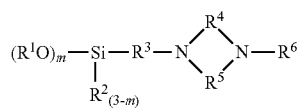
(1)

wherein each of $R^1$ and $R^2$ independently represents an alkyl group having 1 to 20 carbon atoms, or an aryl group; $R^3$ represents an alkylene group having 1 to 20 carbon atoms; $R^4$ and $R^5$, may be identical or different from each other, represent a hydrocarbon group having 1 to 6 carbon atoms, and form a 5 or more-membered ring structure together with two adjacent N; $R^6$ represents a hydrocarbon group having 1 to 20 carbon atoms, a hydrocarbon group substituted with a heteroatom having no active hydrogen and having 1 to 20 carbon atoms, or a triorgano-substituted silyl group; and m is an integer of 2 or 3,
or, by the following formula (2):

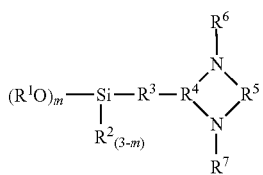
(2)

wherein the definitions of $R^1$ to $R^6$ and m are the same as in the formula (1) described above; and $R^7$ represents a hydrocarbon group having 1 to 20 carbon atoms, a hydrocarbon group which may be substituted with a heteroatom having no active hydrogen and having 1 to 20 carbon, atoms, or a triorgano-substituted silyl group.

[5]
A modified conjugated diene-based polymer, wherein in gel permeation chromatography measurement using a polystyrenic gel-packed column,
the peak area on the lowest molecular weight side accounts for 20 to 50% of an area of a whole chromatogram; and
a modification ratio determined by an amount adsorbed onto a column used in gel permeation chromatography measurement using a silica particle-packed column is 78% by mass or more.

[6]
A method for producing a modified conjugated diene-based polymer, comprising the steps of:
reacting a polyvinyl aromatic compound with an organolithium compound to prepare a polyfunctional anionic polymerization initiator in a range of a molar ratio of the polyvinyl aromatic compound to the organolithium compound of from 0.05 to 1.0;
polymerizing a conjugated diene compound, or copolymerizing a conjugated diene compound with an aromatic vinyl compound by using the polyfunctional anionic polymerization initiator, so as to obtain a conjugated diene-based polymer; and
reacting a living polymer end of the conjugated diene-based polymer with a compound having a silyl group substituted with two or more alkoxy groups, and one or more nitrogen atoms.

[7]
The method for producing the modified conjugated diene-based polymer according to item [6] described above, wherein a molar ratio of the polyvinyl aromatic compound to the organolithium compound is in a range of from 0.1 to 0.45.

[8]
The method for producing the modified conjugated diene-based polymer according to item [6] or [7] described above, wherein the compound having a silyl group substituted with two or more alkoxy groups, and one or more nitrogen atoms is represented by the following formula (1):

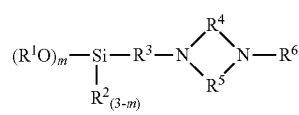
(1)

wherein each of $R^1$ and $R^2$ independently represents an alkyl group having 1 to 20 carbon atoms, or an aryl group; $R^3$ represents an alkylene group having 1 to 20 carbon atoms; $R^4$ and $R^5$, may be identical or different from each other, represent a hydrocarbon group having 1 to 6 carbon atoms, and form a 5 or more-membered ring structure together with two adjacent N; $R^6$ represents a hydrocarbon group having 1 to 20 carbon atoms, a hydrocarbon group substituted with a heteroatom having no active hydrogen and having 1 to 20 carbon atoms, or a triorgano-substituted silyl group; and m is an integer of 2 or 3,
or, by the following formula (2):

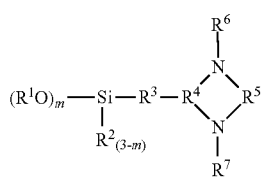
(2)

wherein the definitions of $R^1$ to $R^6$ and m are the same as in the formula (1) described above; and $R^7$ represents a hydrocarbon group having 1 to 20 carbon atoms, a hydrocarbon group which may be substituted with a heteroatom having no active hydrogen and having 1 to 20 carbon atoms, or a triorgano-substituted silyl group.

[9]

A modified conjugated diene-based polymer composition, comprising 0.5 to 300 parts by mass of a silica-based inorganic filler with respect to 100 parts by mass of a rubber component comprising 20 parts by mass or more of the modified conjugated diene-based polymer according to any one of items [1] to [5] described above.

[10]

The modified conjugated diene-based polymer composition according to item [9] described above, further comprising 0.5 to 100 parts by mass of carbon black with respect to 100 parts by mass of the rubber component comprising 20 parts by mass or more of the modified conjugated diene-based polymer.

[11]

The modified conjugated diene-based polymer composition according to item [9] or [10] described above, wherein the silica-based inorganic filler has a nitrogen adsorption specific surface area of 170 m$^2$/g or more.

[12]

A tire comprising the modified conjugated diene-based polymer composition according to any one of items [9] to [11] described above.

Advantageous Effects of Invention

The present invention provides a modified conjugated diene-based polymer which, when made into a vulcanizate containing a silica-based inorganic filler, has an excellent balance between the low hysteresis loss and properties regarding safety such as the wet skid resistance and the low-temperature characteristics, has an abrasion resistance and a strength sufficient for practical uses, and satisfies a good processability; a method for producing the same; a modified conjugated diene-based polymer composition; and a tire.

MODE FOR CARRYING OUT THE INVENTION

Hereinafter, an embodiment (hereinafter, referred to as "the present embodiment") to carry out the present invention will be described in detail. The present invention is not limited to the following embodiment, and various changes and modifications may be made within the gist to carry out the present invention.

In the following, a modified conjugated diene-based polymer according to the present embodiment will be described together with a method for producing the same.

[Modified Conjugated Diene-Based Polymer]

A modified conjugated diene-based polymer according to the present embodiment is one which is obtained by polymerizing a conjugated diene compound, or copolymerizing a conjugated diene compound with an aromatic vinyl compound by using a polyfunctional anionic polymerization initiator prepared from a polyvinyl aromatic compound and an organolithium compound in a range of a molar ratio (the polyvinyl aromatic compound/the organolithium compound) of from 0.05 to 1.0, so as to obtain a conjugated diene-based polymer, and reacting living polymer ends of the conjugated diene-based polymer with a compound having a silyl group substituted with two or more alkoxy groups, and one or more nitrogen atoms, and which has a silyl group substituted with one or more alkoxy groups, and one or more nitrogen atoms on the chain ends of the conjugated diene-based polymer.

[Method for Producing a Modified Conjugated Diene-Based Polymer]

A method for producing a modified conjugated diene-based polymer according to the present embodiment comprises the steps of:

reacting a polyvinyl aromatic compound with an organolithium compound to prepare a polyfunctional anionic polymerization initiator in a range of a molar ratio of the polyvinyl aromatic compound to the organolithium compound of from 0.05 to 1.0;

polymerizing a conjugated diene compound, or copolymerizing a conjugated diene compound with an aromatic vinyl compound by using the polyfunctional anionic polymerization initiator, so as to obtain a conjugated diene-based polymer; and reacting living polymer ends of the conjugated diene polymer with a compound having a silyl group substituted with two or more alkoxy groups, and one or more nitrogen atoms.

By reacting a living polymer end of the conjugated diene-based polymer with a compound (modifier) having a silyl group substituted with two or more alkoxy groups, and one or more nitrogen atoms, a modified conjugated diene-based polymer can be obtained in a form in which one or more alkoxy groups have been diminished from the structure of the original modifier as shown in the following formula (3) as an example.

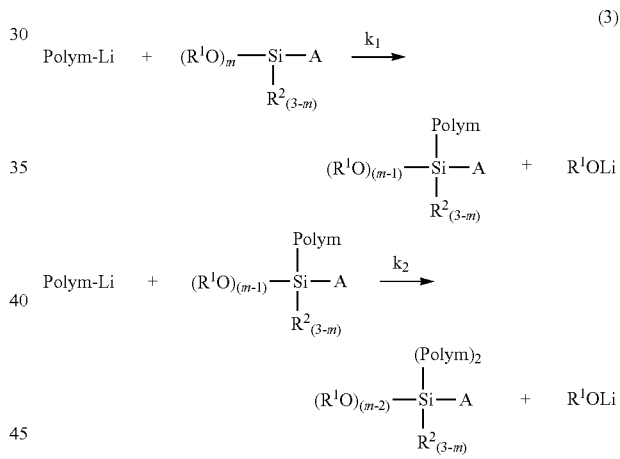

In the formula (3) shown above, Polym represents a conjugated diene-based polymer chain; and $R^1$ and $R^2$ each independently represent an alkyl group or an aryl group.

A represents an organic group containing a nitrogen atom; and m is an integer of 2 or 3.

Herein, $k_1$ represents a reaction rate constant when a first polymer chain is reacted with an alkoxy group bonded to one silyl group, and $k_2$ represents a reaction rate constant when a second polymer chain is reacted therewith. A steric effect around the modifier, and the like make $k_1 > k_2 > \ldots$, and depending on the types of A and $R^2$, the difference in the reaction rate further becomes large. Therefore, it is actually difficult for all of the alkoxy groups in the same modifier to react with living polymer ends.

Therefore, by adding a sufficient amount of a modifier so that the molar number of the alkoxy group becomes sufficient with respect to the molar number of the living polymer ends, a modified conjugated diene-based polymer having a silyl group substituted with one or more alkoxy groups on a polymer end can be obtained.

With respect to the modified conjugated diene-based polymer according to the present embodiment, materials to be used and conditions to produce the polymer will be described together with the production process thereof.

(Polyfunctional Anionic Polymerization Initiator)

First, a polyfunctional anionic polymerization initiator to be used in a step of polymerizing a conjugated diene-based polymer as a prestage in which the above-mentioned living polymer ends of the conjugated diene-based polymer is modified with a compound (modifier) having a silyl group substituted with two or more alkoxy groups, and one or more nitrogen atoms will be described.

A polyfunctional anionic polymerization initiator can be prepared by reacting a polyvinyl aromatic compound with an organolithium compound.

Examples of the preparation methods in a hydrocarbon solvent may include a method in which an organolithium compound and a polyvinyl aromatic compound are reacted, a method in which an organolithium compound and a conjugated diene compound are reacted, and thereafter, a polyvinyl aromatic compound is reacted therewith, a method in which an organolithium compound and a monovinyl aromatic compound are reacted, and thereafter, a polyvinyl aromatic compound is reacted therewith, and a method in which an organolithium compound is reacted in the presence of two or three of a conjugated diene compound and/or a monovinyl aromatic compound and a polyvinyl aromatic compound.

A polyfunctional anionic polymerization initiator is particularly preferable which is prepared by the method in a hydrocarbon solvent in which an organolithium compound and a polyvinyl aromatic compound are reacted, the method therein in which an organolithium compound and a conjugated diene compound are reacted, and thereafter, a polyvinyl aromatic compound is reacted therewith, and the method therein in which a mono-organolithium compound is reacted in the presence of a conjugated diene compound and a polyvinyl aromatic compound.

In order to achieve the acceleration and stabilization of the production of a polyfunctional anionic polymerization initiator, in the preparation, a Lewis base is preferably added to the system.

<Polyvinyl Aromatic Compound>

Examples of the polyvinyl aromatic compounds used in preparation of a polyfunctional anionic polymerization initiator may include o-, m- and p-divinylbenzene, o-, m- and p-diisopropenylbenzene, 1,2,4-trivinylbenzene, 1,2-vinyl-3,4-dimethylbenzene, 1,3-divinylnaphthalene, 1,3,5-trivinylnaphthalene, 2,4-divinylbiphenyl, 3,5,4'-trivinylbiphenyl, 1,2-divinyl-3,4-dimethylbenzene and 1,5,6-trivinyl-3,7-diethylnaphthalene. These may be used singly or concurrently in two or more.

Particularly divinylbenzene and diisopropenylbenzene are preferable, and the polyvinyl aromatic compound may be a mixture of o-, m- and p-isomers thereof. In the case of industrial utilization, use of the isomer mixture is economically more advantageous.

<Conjugated Diene Compound and Monovinyl Aromatic Compound>

For the preparation of a polyfunctional anionic polymerization initiator, a conjugated diene compound and/or a monovinyl aromatic compound may be used together with the above-mentioned polyvinyl aromatic compound.

Examples of the conjugated diene compounds may include 1,3-butadiene, isoprene, 2,3-dimethyl-1,3-butadiene, 1,3-pentadiene, 3-methyl-1,3-pentadiene, 1,3-heptadiene and 1,3-hexadiene, and particularly 1,3-butadiene and isoprene are preferable.

Examples of the monovinyl aromatic compounds may include styrene, p-methylstyrene, α-methylstyrene, vinylethylbenzene, vinylxylene and vinylnaphthalene, and particularly styrene is preferable.

The conjugated diene compound and/or the monovinyl aromatic compound are added preferably so that the polystyrene equivalent weight-average molecular weight of a polyfunctional anionic polymerization initiator as measured by GPC (gel permeation chromatography) is in a range of from 500 to 20,000, and more preferably in a range of from 1,000 to 10,000.

<Organolithium Compound>

Examples of the organolithium compounds used in preparation of a polyfunctional anionic polymerization initiator may include mono-organolithium compounds such as n-butyllithium, sec-butyllithium, tert-butyllithium, n-propyllithium, iso-propyllithium and benzyllithium; and polyfunctional organolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene and 1,3,5-trilithio-2,4,6-triethylbenzene.

Mono-organolithium compounds of n-butyllithium, sec-butyllithium and tert-butyllithium, are particularly preferable.

<Hydrocarbon Solvent>

Examples of the hydrocarbon solvent used in preparation of a polyfunctional anionic polymerization initiator may include aliphatic hydrocarbons such as butane, pentane, hexane and heptane; alicyclic hydrocarbons such as cyclopentane and cyclohexane, and aromatic hydrocarbons such as benzene, toluene and xylene.

<Lewis Base>

In the preparation of a polyfunctional anionic polymerization initiator, the addition of a Lewis base in the system can achieve the acceleration and stabilization of the production.

The Lewis base may include tertiary monoamines, tertiary diamines and linear or cyclic ethers.

Examples of the tertiary monoamines may include compounds such as trimethylamine, triethylamine, methyldiethylamine, 1,1-dimethoxytrimethylamine, 1,1-diethoxytrimethylamine, 1,1-diethoxytriethylamine, N,N-dimethylformamide diisopropyl acetal and N,N-dimethylformamide dicyclohexyl acetal.

Examples of the tertiary diamines may include compounds such as N,N,N',N'-tetramethyldiaminomethane, N,N,N',N'-tetramethylethylenediamine, N,N,N',N'-tetramethylpropanediamine, N,N,N',N'-tetramethyldiaminobutane, N,N,N', N'-tetramethyldiaminopentane, N,N,N',N'-tetramethylhexanediamine, dipyperidinopentane and dipiperidinoethane.

Examples of the linear ethers may include dimethyl ether, diethyl ether, ethylene glycol dimethyl ether, diethylene glycol dimethyl ether, triethylene glycol dimethyl ether and tetraethylene dimethyl ether.

Examples of the cyclic ethers include compounds such as tetrahydrofuran, bis(2-oxolanyl)ethane, 2,2-bis(2-oxolanyl)propane, 1,1-bis(2-oxolanyl)ethane, 2,2-bis(2-oxolanyl)butane, 2,2-bis(5-methyl-2-oxolanyl)propane and 2,2-bis(3,4,5-trimethyl-2-oxolanyl)propane.

Among the Lewis bases described above, preferable are trimethylamine and triethylamine, which are tertiary monoamines, N,N,N',N'-tetramethylethylenediamine, which is a tertiary diamine, and tetrahydrofuran and 2,2-bis(2-oxolanyl)propane, which are cyclic ethers.

The Lewis base described above may be used singly or in combination of two or more.

The amount of a polyvinyl aromatic compound used in preparation of a polyfunctional anionic polymerization initiator is set in a range of from 0.05 to 1.0 mol with respect to 1 mol of an organolithium compound.

Thereby, a polyfunctional anionic polymerization initiator having a molar ratio of a polyvinyl aromatic compound/an organolithium compound in a range of from 0.05 to 1.0 can be obtained.

A larger use amount of a polyvinyl aromatic compound with respect to an organolithium compound increases the proportion of a molecular chain end to which a functional group is imparted by a modification reaction of a conjugated diene-based polymer as described later, achieves improvements in the affinity for and the reactivity with a silica-based particle as described later, makes good a balance between the low hysteresis loss and the wet skid resistance in a modified conjugated diene-based polymer composition, and also achieves improvements in the abrasion resistance and the strength. By contrast, a smaller use amount of the polyvinyl aromatic compound with respect to the organolithium compound makes good the processability in kneading a composition thereof or otherwise. A Mooney viscosity of the mixed rubber compound can be used as an index of processability. Too high a Mooney viscosity of a mixed rubber compound causes adverse effects such as an increase in power consumption due to a rise in a torque in kneading, and also causes uniform sheet fabrication to become difficult in a sheeting process after kneading. An attempt to lower the hysteresis loss generally increase the Mooney viscosity of a mixed rubber compound, which causes inferior processability. It is important to keep the Mooney viscosity not too high. From these balances, the amount of the polyvinyl aromatic compound is preferably in a range of from 0.1 to 0.5 mol, more preferably in a range of from 0.1 to 0.45, and still more preferably in a range of from 0.1 to 0.4, with respect to 1 mol of the organolithium compound.

In the case of adding a Lewis base when a polyfunctional anionic polymerization initiator is prepared, the Lewis base is added preferably in a range of from 30 to 50,000 ppm, and preferably in a range of from 200 to 20,000 ppm, with respect to the above-mentioned solvent used in the preparation of the polyfunctional anionic polymerization initiator.

In order to sufficiently develop effects of the reaction acceleration and stabilization, the addition of 30 ppm or more is preferable, and in consideration of securing flexibility in the microstructure adjustment in a later polymerization process, and separating the Lewis base from a polymerization solvent in a process in which the solvent is recovered after the polymerization and purified, the addition of 50,000 ppm or less is preferable.

The temperature in the preparation of a polyfunctional anionic polymerization initiator is preferably in a range of from 10° C. to 140° C., and more preferably in a range of from 35° C. to 110° C.

The temperature is preferably 10° C. or higher from the viewpoint of the productivity, and preferably 140° C. or lower in order to suppress side reactions due to a high temperature.

The reaction time for preparing a polyfunctional anionic polymerization initiator depends on the reaction temperature, but is in a range of from 5 min to 24 hours.

(Conjugated Diene-Based Polymer)

A conjugated diene-based polymer in the state before the modification of the modified conjugated diene-based polymer according to the present invention is obtained by polymerizing a conjugated diene compound, or copolymerizing a conjugated diene compound with an aromatic vinyl compound by using the above-mentioned polyfunctional anionic polymerization initiator.

In a polymerization process of a conjugated diene-based polymer, the above-mentioned polyfunctional anionic polymerization initiator may be prepared in advance in a predetermined reactor, and fed to a reactor, in which the polymerization of a conjugated diene compound, or the copolymerization of a conjugated diene compound with an aromatic vinyl compound is carried out, to carry out the polymerization reaction; or the polyfunctional anionic polymerization initiator may be prepared in advance in a reactor in which the polymerization or the copolymerization is carried out as described later, and predetermined monomers may be fed to the reactor to carry out the polymerization reaction.

It is preferable from the viewpoint of the productivity and quality stability in mass production of a polymer that a polyfunctional anionic polymerization initiator is prepared in advance in a predetermined reactor, and is fed, as required, to a reactor used for the polymerization of a conjugated diene compound, or the copolymerization of a conjugated diene compound with an aromatic vinyl compound.

The polymerization of a conjugated diene-based polymer can be carried out as a batch process or as a continuous process with one reactor, or two or more series of reactors. The polymerization in a batch reactor is preferably carried out from the viewpoint of obtaining a polymer having a higher modification ratio in a modification reaction described later.

<Polar Compound>

In production of a conjugated diene-based polymer, for the purpose of randomly copolymerizing an aromatic vinyl compound with a conjugated diene compound, for the purpose of controlling the microstructure of the conjugated diene moiety, and further for the purpose of improving the polymerization rate, and the like, a small amount of the following polar compound may be added.

Examples of the polar compound may include ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, 2,2-bis(2-oxolanyl)propane; tertiary amine compounds such as tetramethylethylenediamine, dipiperidinoethane, trimethylamine, triethylamine, pyridine and quinuclidine; alkaline metal alkoxide compounds such as potassium-t-amylate, potassium-t-butyrate, sodium-t-butyrate and sodium amylate, and phosphine compounds such as triphenyl phosphine.

These polar compounds may be used singly or in combination of two or more.

The use amount of a polar compound is selected according to the purpose and the degree of the effect, but is generally from 0.01 to 100 mol with respect to 1 mol of lithium in added polyfunctional anionic polymerization initiator.

Such a polar compound can be used for controlling the microstructure of the polymer diene moiety in a proper amount according to a desired vinyl linkage amount.

Many of polar compounds simultaneously have an effective randomization effect in the copolymerization of a conjugated diene compound with an aromatic vinyl compound, and can regulate the distribution of the aromatic vinyl compound, and regulate the styrene block amount.

As a randomization method, a method may also be used in which a part of 1,3-butadiene is intermittently added in the course of the copolymerization as described in Japanese Patent Laid-Open No. 59-140211.

<Conjugated Diene Compound>

Examples of the conjugated diene compounds used in the synthesis of a conjugated diene-based polymer may include 1,3-butadiene, isoprene, 2,3-dimethyl-1,3-butadiene, 1,3-pentadiene, 3-methyl-1,3-pentadiene, 1,3-heptadiene and 1,3-hexadiene. Above all, particularly 1,3-butadiene and isoprene are preferable. These may be used singly or in combination of two or more.

If allenes and acetylenes are contained as impurities, since the modification reaction described later is inhibited, the total concentration thereof is preferably 200 ppm or less, more preferably 100 ppm or less, and still more preferably 50 ppm or less.

<Aromatic Vinyl Compound>

Examples of the aromatic vinyl compounds used in the synthesis of a conjugated diene-based polymer may include styrene, p-methylstyrene, α-methylstyrene, vinylethylbenzene, vinylxylene, vinylnaphthalene and diphenylethylene. Above all, particularly styrene is preferable. These may be used singly or in combination of two or more.

<Polymerization Solvent>

A conjugated diene-based polymer is polymerized in a predetermined solvent.

Examples of the solvent to be used may include hydrocarbon-based solvents such as saturated hydrocarbons and aromatic hydrocarbons. Specific examples thereof may include aliphatic hydrocarbons such as butane, pentane, hexane and heptane; alicyclic hydrocarbons such as cyclopentane, cyclohexane, methylcyclopentane and methylcyclohexane; and aromatic hydrocarbons such as benzene, toluene and xylene, and hydrocarbons composed of these mixtures.

<Polymerization Condition>

The polymerization temperature of a conjugated diene-based polymer is not particularly limited as long as the temperature is one at which a living anionic polymerization progresses, but preferably 0° C. or higher from the viewpoint of the productivity, and preferably 120° C. or lower from the viewpoint of sufficiently securing the modification reaction amount to the living polymer end after the completion of the polymerization. The temperature is more preferably in a range of from 20 to 100° C., and still more preferably in a range of from 30 to 85° C.

The polymerization temperature can be controlled, in consideration of the polymerization being an exothermic reaction, further by regulating the feed temperatures of the monomer and the solvent, controlling the monomer concentration, and cooling and heating from outside the reactor.

Before the above-mentioned conjugated diene compound, aromatic vinyl compound and polymerization solvent each singly or a mixed solution thereof is fed to the polymerization reaction, allenes and acetylenes as impurities may be treated using an organometal compound in advance. Thereby, the amount of living polymer end before the modification reaction becomes a high concentration, allowing achieving a higher modification ratio.

<Structure of a Conjugated Diene-Based Polymer>

In the case where the wet skid characteristic is attached much importance to in a modified conjugated diene-based polymer composition containing a modified conjugated diene-based polymer and a filler described later, the content of an aromatic vinyl unit in a conjugated diene-based polymer is preferably from 1 to 50% by mass, more preferably from 10 to 45% by mass, and still more preferably from 20 to 40% by mass.

The content of the aromatic vinyl unit in the conjugated diene-based polymer before the modification is preferably 1% by mass or more from the viewpoint of obtaining an excellent wet skid resistance, and preferably 50% by mass or less from the viewpoint of the low hysteresis loss and the abrasion resistance.

The proportion of a 1,2- or 3,4-linkage in a conjugated diene unit of a conjugated diene-based polymer before the modification is preferably from 10 to 80% by mass, more preferably from 15 to 70% by mass, and still more preferably from 25 to 65% by mass.

The proportion of a 1,2- or 3,4-linkage in a conjugated diene unit of a conjugated diene-based polymer is preferably 10% by mass or more as described above from the viewpoint of obtaining an excellent wet skid resistance, and preferably 80% by mass or less from the viewpoint of the low hysteresis loss and the abrasion resistance.

The comonomer distribution of conjugated diene and aromatic vinyl in a conjugated diene-aromatic vinyl copolymer chain is such that the conjugated diene and the aromatic vinyl may be distributed uniformly or nonuniformly in a molecular chain thereof, or may be present as blocks.

On the other hand, in the case where the acquisition of excellent low-temperature characteristics is a purpose in a modified conjugated diene-based polymer composition containing a modified conjugated diene-based polymer and a filler described later, the content of an aromatic vinyl unit in the conjugated diene-aromatic vinyl copolymer is preferably 10% by mass or less, and more preferably a homopolymer of the conjugated diene. The proportion of a 1,2- or 3,4-linkage in a conjugated diene unit of a conjugated diene-based polymer before the modification is preferably 30% by mass or less, and more preferably 25% by mass or less.

When the respective component ratios are in the range described above, a composition having a low glass transition temperature and excelling in low-temperature characteristics can be obtained.

<Modifier>

The modified conjugated diene-based polymer according to the present embodiment has living polymer ends modified with a modifier.

In detail, the modified conjugated diene-based polymer according to the present embodiment can be obtained by producing a conjugated diene polymer by polymerizing a conjugated diene compound described above, or copolymerizing a conjugated diene compound with an aromatic vinyl compound by using a polyfunctional anionic polymerization initiator described above, and reacting living polymer ends of the conjugated diene-based polymer with a compound (modifier) having a silyl group substituted with two or more alkoxy groups, and one or more nitrogen atoms.

The compound, used for the modification reaction, having a silyl group substituted with two or more alkoxy groups, and one or more nitrogen atoms includes hydrocarbyloxysilanes having a cyclic amino group containing two or more nitrogen atoms, represented by the following formula (1):

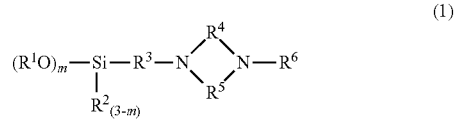

(1)

wherein each of $R^1$ and $R^2$ independently represents an alkyl group having 1 to 20 carbon atoms, or an aryl group; $R^3$ represents an alkylene group having 1 to 20 carbon atoms; $R^4$ and $R^5$, may be identical or different from each other, represent a hydrocarbon group having 1 to 6 carbon atoms, and form a 5 or more-membered ring structure together with two adjacent N; $R^6$ represents a hydrocarbon group having 1 to 20 carbon atoms, a hydrocarbon group which may be substituted with a heteroatom having no active hydrogen and having 1 to 20 carbon atoms, or a triorgano-substituted silyl group; and m is an integer of 2 or 3,
or, by the following formula (2):

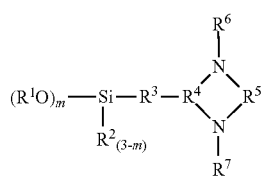

(2)

wherein the definitions of $R^1$ to $R^6$ and m are the same as in the formula (1) described above; and $R^7$ represents a hydrocarbon group having 1 to 20 carbon atoms, a hydrocarbon group substituted with a heteroatom having no active hydrogen and having 1 to 20 carbon atoms, or a triorgano-substituted silyl group; and hydrocarbyloxysilanes containing functional groups such as another cyclic amine, a non-cyclic amine, an imine and an isocyanate, and cyclic azasilanes.

Note that in the above, the active hydrogen refers to a hydrogen atom bonded to O, N and the like, which have a high electronegativity ("Kagaku Jiten (Chemical Dictionary)", published by Tokyo Kagaku Dojin Co., Ltd.).

Further, in the above, the triorgano-substituted silyl group refers to a group represented by the general formula: —$SiR^8{}_3$ (three $R^8$ represent organic groups which may be identical or different from each other, and preferably represents an alkyl group).

Specific examples of the hydrocarbyloxysilanes having the cyclic amino group represented by the above formula (1) are shown below.

Examples thereof may include 1-[3-(triethoxysilyl)propyl]-4-methylpiperazine, 1-[3-(diethoxyethylsilyl)propyl]-4-methylpiperazine, 1-[3-(trimethoxysilyl)propyl]-3-methylimidazolidine, 1-[3-(diethoxyethylsilyl)propyl]-3-ethylimidazolidine, 1-[3-(triethoxysilyl)propyl]-3-methylhexahydropyrimidine, 1-[3-(dimethoxymethylsilyl)propyl]-3-methylhexahydropyrimidine, 3-[3-(tributoxysilyl)propyl]-1-methyl-1,2,3,4-tetrahydropyrimidine, 3-[3-(dimethoxymethylsilyl)propyl]-1-ethyl-1,2,3,4-tetrahydropyrimidine, 1-(2-ethoxyethyl)-3-[3-(trimethoxysilyl)propyl]imidazolidine, (2-{3-[3-(trimethoxysilyl)propyl]tetrahydropyrimidine-1-yl}ethyl)dimethylamine, 1-[3-(triethoxysilyl)propyl]-4-(trimethylsilyl)piperazine, 1-[3-(dimethoxymethylsilyl)propyl]-4-(trimethylsilyl)piperazine, 1-[3-(tributoxysilyl)propyl]-4-(trimethylsilyl)piperazine, 1-[3-(diethoxyethylsilyl)propyl]-3-(triethylsilyl)imidazolidine, 1-[3-(triethoxysilyl)propyl]-3-(trimethylsilyl)imidazolidine, 1-[3-(dimethoxymethylsilyl)propyl]-3-(trimethylsilyl)hexahydropyrimidine, 1-[3-(triethoxysilyl)propyl]-3-(triethylsilyl)hexahydropyrimidine and 1-[4-(triethoxysilyl)butyl]-4-(trimethylsilyl)piperazine.

Above all, preferably used are 1-[3-(triethoxysilyl)propyl]-4-methylpiperazine, 1-[3-(trimethoxysilyl)propyl]-3-methylimidazolidine, 1-[3-(triethoxysilyl)propyl]-3-methylhexahydropyrimidine, 1-[3-(triethoxysilyl)propyl]-4-(trimethylsilyl)piperazine, 1-[3-(triethoxysilyl)propyl]-3-(trimethylsilyl)imidazolidine and 1-[3-(triethoxysilyl)propyl]-3-(trimethylsilyl)hexahydropyrimidine, and more preferable are 1-[3-(triethoxysilyl)propyl]-4-methylpiperazine and 1-[3-(triethoxysilyl)propyl]-4-(trimethylsilyl)piperazine.

Specific examples of the hydrocarbyloxysilanes having the cyclic amino group represented by the above formula (2) are shown below.

Examples thereof may include 2-[3-(trimethoxysilyl)propyl]-1,3-dimethylimidazolidine, 2-(diethoxyethylsilyl)-1,3-diethylimidazolidine, 2-(triethoxysilyl)-1,4-diethylpiperazine, 2-(dimethoxymethylsilyl)-1,4-dimethylpiperazine, 5-(triethoxysilyl)-1,3-dipropylhexahydropyrimidine, 5-(diethoxyethylsilyl)-1,3-diethylhexahydropyrimidine, {2-[3-(2-dimethylaminoethyl)-2-(ethyldimethoxysilyl)-imidazolidine-1-yl]-ethyl}-dimethylamine, 5-(trimethoxysilyl)-1,3-bis-(2-methoxyethyl)-hexahydropyrimidine, 5-(ethyldimethoxysilyl)-1,3-bis-(2-trimethylsilylethyl)-hexahydropyrimidyl)-1,3-dimethylimidazolidine, 2-(3-diethoxyethylsilyl-propyl)-1,3-diethylimidazolidine, 2-(3-triethoxysilyl-propyl)-1,4-diethylpiperazine, 2-(3-dimethoxymethylsilyl-propyl)-1,4-dimethylpiperazine, 5-(3-triethoxysilyl-propyl)-1,3-dipropylhexahydropyrimidine, 5-(3-diethoxyethylsilyl-propyl)-1,3-diethylhexahydropyrimidine, {2-[3-(2-dimethylaminoethyl)-2-(3-ethyldimethoxysilyl-propyl)-imidazolidin-1-yl]-ethyl}-dimethylamine, 5-(3-trimethoxysilyl-propyl)-1,3-bis-(2-methoxyethyl)-hexahydropyrimidine, 5-(3-ethyldimethoxysilyl-propyl)-1,3-bis-(2-trimethylsilylethyl)-hexahydropyrimidine, 2-[3-(trimethoxysilyl)propyl]-1,3-bis(trimethylsilyl)imidazolidine, 2-(diethoxyethylsilyl)-1,3-bis(triethylsilyl)imidazolidine, 2-(triethoxysilyl)-1,4-bis(trimethylsilyl)piperazine, 2-(dimethoxymethylsilyl)-1,4-bis(trimethylsilyl)piperazine and 5-(triethoxysilyl)-1,3-bis(tripropylsilyl)hexahydropyrimidine.

Above all, preferable are 2-[3-(trimethoxysilyl)propyl]-1,3-dimethylimidazolidine and 2-[3-(trimethoxysilyl)propyl]-1,3-(bistrimethylsilyl)imidazolidine.

Hydrocarbyloxysilanes, used as a modifier and other than compounds represented by the above formulae (1) and (2), containing functional groups such as a cyclic amine, a non-cyclic amine, an imine and an isocyanate, and cyclic azasilanes will be described.

Specific examples of the hydrocarbyloxysilanes having a cyclic amino group are shown below.

Examples thereof may include [3-(1-hexamethyleneimino)propyl]triethoxysilane, [3-(1-hexamethyleneimino)propyl]trimethoxysilane, [2-(1-hexamethyleneimino)ethyl]triethoxysilane, [2-(1-hexamethyleneimino)ethyl]trimethoxysilane, [3-(1-pyrrolidinyl)propyl]triethoxysilane, [3-(1-pyrrolidinyl)propyl]trimethoxysilane, [3-(1-heptamethyleneimino)propyl]triethoxysilane, [3-(1-dodecamethyleneimino)propyl]triethoxysilane, [3-(1-hexamethyleneimino)propyl]diethoxymethylsilane and [3-(1-hexamethyleneimino)propyl]diethoxyethylsilane.

Specific examples of the hydrocarbyloxysilanes having a non-cyclic amino group are shown below.

Examples thereof may include [3-(dimethylamino)propyl]triethoxysilane, [3-(dimethylamino)propyl]trimethoxysilane, [3-(diethylamino)propyl]triethoxysilane, [3-(diethylamino)propyl]trimethoxysilane, [2-(dimethylamino)ethyl]triethoxysilane, [2-(dimethylamino)ethyl]trimethoxysilane, [3-(dimethylamino)propyl]diethoxymethylsilane, [3-dibutylaminopropyl]triethoxysilane, N,N-bis(trimethylsilyl)aminopropylmethyldimethoxysilane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)

aminoethyltriethoxysilane, N,N-bis(trimethylsilyl) aminoethylmethyldimethoxysilane and N,N-bis (trimethylsilyl)aminoethylmethyldiethoxysilane.

Specific examples of the hydrocarbyloxysilanes having an imino group are shown below.

Examples thereof may include N-(1,3-dimethylbutylidene)-3-(triethoxysilyl)-1-propanamine, N-(1-methylethylidene)-3-(triethoxysilyl)-1-propanamine, N-ethylidene-3-(triethoxysilyl)-1-propanamine, N-(1-methylpropylidene)-3-(triethoxysilyl)-1-propanamine, N-(4-N,N-dimethylaminobenzylidene)-3-(triethoxysilyl)-1-propanamine, N-(cyclohexylidene)-3-(triethoxysilyl)-1-propanamine, 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5-dihydroimidazole, N-(3-isopropoxysilylpropyl)-4,5-dihydroimidazole and N-(3-methyldiethoxysilylpropyl)-4,5-dihydroimidazole.

Specific examples of the hydrocarbyloxysilanes having an isocyanate group are shown below.

Examples thereof may include 3-isocyanatopropyltrimethoxysilane, 3-isocyanatopropyltriethoxysilane, 3-isocyanatopropylmethyldiethoxysilane, 3-isocyanatopropyltriisopropoxysilane and tris(3-trimethoxysilylpropyl) isocyanurate.

Specific examples of the cyclic azasilane compounds are shown below.

Examples thereof may include N-n-butyl-aza-2,2-dimethoxysilacyclopentane, N-ethyl-aza-2,2-diethoxy-4-methylsilacyclopentane, N-allyl-aza-2,2-dimethoxysilacyclopentane and 1-trimethylsilyl-2,2-dimethoxy-1-aza-2-silacyclopentane.

Among the modifiers described above, the compounds represented by the above formula (1) or formula (2) are preferable, and particularly the compounds represented by the above formula (1) are preferable.

These modifiers may be used singly or concurrently in two or more.

(Modification Reaction)

The modification reaction of the conjugated diene-based polymer using the modifier described above will be described.

The reaction temperature, the reaction time and the like when the modifier is reacted with living polymer ends of the conjugated diene-based polymer are not particularly limited, but the reaction is preferably carried out at 0° C. or higher and 120° C. or lower and for 30 sec or longer.

The modifier is preferably added so that the total molar number of an alkoxy group bonded to a silyl group in the modifier added is in a range of from 1 to 5 times the total molar number of lithium contained in added polyfunctional anionic polymerization initiator described above, more preferably in a range of from 1.5 to 3 times, and still more preferably in a range of from 1.5 to 2.5 times.

From the viewpoint of acquiring a predetermined modification ratio and making one or more alkoxy groups remain at a modified conjugated diene-based molecular chain end portion, the modifier is preferably added so that the total molar number of an alkoxy group bonded to a silyl group in the modifier added is one or more times the total molar number of lithium contained in added polyfunctional anionic polymerization initiator described above, and from the viewpoint of the cost, more preferably 5 or less times.

The content of a polymer having the functional group components in a modified conjugated diene-based polymer, that is, the modification ratio is, in the case where a composition using the modified conjugated diene-based polymer according to the present embodiment is made into a vulcanizate, preferably 78% by mass or more, more preferably 86% by mass or more, and still more preferably 90% by mass or more, in order to make a good balance between the low hysteresis loss and the wet skid resistance, and acquire an abrasion resistance and strength sufficient for practical uses.

The modification ratio of 78% by mass or more can be obtained as described above by controlling the concentrations of allenes and acetylenes as impurities in the conjugated diene compound as described above, a treatment method thereof, and the polymerization temperature.

A measurement method of the content of a polymer having the functional group component, that is, the modification ratio, is preferably one by chromatography which can separate modified components containing functional groups and unmodified components.

As the measurement method by chromatography, a method is suitable which uses a gel permeation chromatography (GPC) column packed with a polar substance such as silica which can adsorb the functional group component, and quantitatively determines the modification ratio by using an internal standard of a non-adsorptive component for comparison.

The weight-average molecular weight (GPC measurement: polystyrene equivalent molecular weight) of the modified conjugated diene-based polymer according to the present embodiment is preferably from 100,000 to 2,000,000, more preferably from 200,000 to 1,000,000, and still more preferably from 250,000 to 500,000, in consideration of the processability and physical properties.

In the case where a conjugated diene-based polymer is polymerized in a batch process, in the molecular weight distribution in GPC, a plurality of peaks is observed. The peak on the lowest molecular weight side is considered to be mainly a component whose polymerization has been initiated and produced by a monofunctional component in a polyfunctional initiator mixture. A larger amount of a polyfunctional component gives excellent physical properties such as the low hysteresis loss and abrasion resistance, whereas it worsens the processability, therefore the peak area on the lowest molecular weight side is preferably from 20 to 50%.

By regulating the molar ratio of a polyvinyl aromatic compound and an organolithium compound when a polyfunctional anionic polymerization initiator is prepared, and the amount of a modifier added in the above-mentioned ranges, the peak area on the lowest molecular weight side can be made 20 to 50% as described above.

After a conjugated diene-based polymer is subjected to a modification reaction with a modifier described above, a reaction terminator may be added in a polymer solution as required.

The reaction terminators usable are generally alcohols such as methanol, ethanol and propanol; organic acids such as stearic acid, lauric acid and octanoic acid; and water and the like.

After a conjugated diene-based polymer is subjected to a modification reaction, metals contained in the polymer may be demineralized as required.

As a demineralization method, a method is used which brings, for example, water, an organic acid, an inorganic acid or an oxidizing agent such as hydrogen peroxide into contact with a polymer solution to extract metals, and thereafter separates a water layer.

After a conjugated diene-based polymer is subjected to a modification reaction, an antioxidant may be added to a polymer solution. The antioxidant includes phenolic stabilizers, phosphorus-based stabilizers and sulfur-based stabilizers.

As a method for obtaining the modified conjugated diene-based polymer according to the present embodiment from a polymer solution, conventionally known methods can be applied.

For example, a method in which after a solvent is removed by steam stripping or the like, the polymer is filtrated, and further dewatered and dried to obtain the polymer, a method in which the polymer solution is concentrated in a flushing tank, and devolatilized by a vent extruder or the like, a method of directly devolatilizing by a drum drier or the like, and other methods can be applied.

[Modified Conjugated Diene-Based Polymer Composition]

The modified conjugated diene-based polymer composition according to the present embodiment contains 20 parts by mass or more of a modified conjugated diene-based polymer as have been described hitherto with respect to 100 parts by mass of the whole of rubber components, and 0.5 to 300 parts by mass of a silica-based inorganic filler with respect to 100 parts by mass of the rubber components containing the polymer.

(Silica-Based Inorganic Filler)

As a silica-based inorganic filler contained in the modified conjugated diene-based polymer composition according to the present embodiment, a solid particle containing $SiO_2$ or $Si_3Al$ as a main component of the structural unit can be used.

Examples thereof may include silica, clay, talc, mica, diatomaceous earth, wollastonite, montmorillonite, zeolite, and inorganic fibrous substances such as glass fiber.

A silica-based inorganic filler whose surface has been hydrophobicized, and a mixture of a silica-based inorganic filler and an inorganic filler other than silica types can also be used.

Above all, silica and glass fiber are preferable, and silica is more preferable.

The silica usable is fumed silica, precipitated silica, synthetic silicate silica and the like, but above all, precipitated silica is preferable, which most outstandingly has a simultaneously exhibited effect of the improvement in fracture characteristics and the wet skid resistance.

In the modified conjugated diene-based polymer composition according to the present embodiment, from the viewpoint of acquiring an abrasion resistance and strength good for practical uses, the nitrogen adsorption specific surface area of a silica-based inorganic filler as measured by BET adsorption method is preferably from 170 to 300 $m^2/g$, and more preferably from 200 to 300 $m^2/g$.

As described above, the blend amount of a silica-based inorganic filler in a modified conjugated diene-based polymer composition is from 0.5 to 300 parts by mass with respect to 100 parts by mass of the rubber components containing 20 parts by mass or more of a modified conjugated diene-based polymer, but the amount is preferably from 5 to 200 parts by mass, and more preferably from 20 to 100 parts by mass.

If the blend amount of a silica-based inorganic filler is less than 0.5 part by mass, the effect of addition of the filler is not developed; by contrast, if that exceeds 300 parts by mass, the dispersibility of the silica-based inorganic filler is deteriorated, the processability of the composition is worsened, and the mechanical strength decreases, which are not preferable.

(Carbon Black)

Carbon black may be added to the modified conjugated diene-based polymer composition as a reinforcing filler other than the silica-based inorganic filler.

Carbon black of any class of SRF, FEF, HAF, ISAF, SAF and the like can be used. A carbon black is preferable which has a nitrogen adsorption specific surface area of 50 $m^2/g$ or more, and a DBP oil absorption of 80 ml/100 g.

The blend amount of a carbon black is preferably from 0.5 to 100 parts by mass, more preferably from 3 to 100 parts by mass, and still more preferably from 5 to 50 parts by mass, with respect to 100 parts by mass of the rubber components containing 20 parts by mass or more of the modified conjugated diene polymer.

In order to develop performances, required for applications such as tires, such as the dry grip performance and electro-conductivity, the amount added is preferably 0.5 part by mass or more, but is preferably 100 parts by mass or less from the viewpoint of the dispersibility.

(Metal Oxide and Metal Hydroxide)

To the modified conjugated diene-based polymer composition according to the present embodiment, metal oxides and metal hydroxides may be added other than the silica-based inorganic filler and the carbon black.

The metal oxide refers to a solid particle having a chemical formula $M_xO_y$ (M represents a metal atom, and x and y are each an integer of 1 to 6) as a main component of the structural unit, and metal oxides usable are for example alumina, titanium oxide, magnesium oxide and zinc oxide. A mixture of a metal oxide and an inorganic filler other than metal oxides may be used.

The metal hydroxide refers to aluminum hydroxide, magnesium hydroxide, zirconium hydroxide and the like.

(Silane Coupling Agent)

The modified conjugated diene-based polymer composition according to the present embodiment may contain a silane coupling agent.

The silane coupling agent has a function of enhancing the interaction between the rubber components and the silica-based inorganic filler, and has groups exhibiting affinity for or bondability with each of the rubber components and the silica-based inorganic filler.

Examples of the silane coupling agent may include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

The blend amount of a silane coupling agent is preferably from 0.1 to 30 parts by mass, more preferably from 0.5 to 20 parts by mass, and still more preferably from 1 to 15 parts by mass, with respect to 100 parts by mass of a silica-based inorganic filler described above.

If the blend amount of a silane coupling agent is less than 0.1 part by mass with respect to 100 parts by mass of a silica-based inorganic filler, an effective blend effect cannot be obtained, and an amount thereof exceeding 30 parts by mass is not needed.

A method of mixing a modified conjugated diene polymer, a silica-based inorganic filler, carbon black and other fillers, and a silane coupling agent is not particularly limited.

Examples thereof may include a melt kneading method using a usual mixer such as an open roll, a Banbury mixer, a kneader, a single-screw extruder, a twin-screw extruder or a multi-screw extruder, and a method in which each component is dissolved and mixed, and thereafter, a solvent is heated and removed.

Above all, the melt kneading method using a roll, a Banbury mixer, a kneader or an extruder is preferable from the viewpoint of the productivity and a good kneadability.

Either of a method in which a modified conjugated diene-based polymer and various blending agents are kneaded at one time, and a method in which these are mixed in a plurality of times can be applied.

(Vulcanizing Agent)

The modified conjugated diene-based polymer composition according to the present embodiment may be made into a vulcanized composition which has been subjected to a vulcanization treatment with a vulcanizing agent.

Examples of vulcanizing agents usable are radical generating agents such as organic peroxides and azo compounds, oxime compounds, nitroso compounds, polyamine compounds, sulfur and sulfur compounds.

The sulfur compounds may include sulfur monochloride, sulfur dichloride, disulfide compounds and polymeric polysulfide compounds.

The use amount of a vulcanizing agent is generally from 0.01 to 20 parts by mass, and preferably from 0.1 to 15 parts by mass, with respect to 100 parts by mass of the rubber components containing the modified conjugated diene polymer.

As a vulcanization method, conventionally known methods can be applied, and the vulcanization temperature can be set, for example, at 120 to 200° C., and suitably at 140 to 180° C.

(Vulcanization Accelerator and Vulcanization Aid)

In vulcanization, a vulcanization accelerator may be used as required.

As a vulcanization accelerator, conventional well-known materials can be used, and examples thereof may include sulfenamides, guanidines, thiurams, aldehyde-amines, aldehyde-ammonias, thiazoles, thioureas and dithiocarbamates. As a vulcanization aid, zinc oxide, stearic acid and the like can be used.

The use amount of a vulcanization accelerator is generally from 0.01 to 20 parts by mass, and preferably from 0.1 to 15 parts by mass, with respect to 100 parts by mass of the rubber components containing the modified conjugated diene polymer.

(Rubber Softener)

To the modified conjugated diene-based polymer composition according to the present embodiment, a rubber softener may be blended in order to improve the processability.

As a rubber softener, mineral oil, or a liquid or low-molecular weight synthetic softener is suitable.

A mineral oil-based rubber softener called process oil or extender oil used to improve the softening, volume increase and processability of rubbers is a mixture of aromatic rings, naphthene rings and paraffin chains; the mineral oil-based rubber softener in which the carbon number of the paraffin chain accounts for 50% or more of the total carbon is called a paraffin type, one in which the carbon number of the naphthene ring accounts for 30 to 45% is called a naphthene type, and one in which the aromatic carbon number exceeds 30% is called an aromatic type. As a rubber softener used in the present embodiment, the naphthene type and/or the paraffin type is preferable.

The amount of a rubber softener blended is preferably from 0 to 100 parts by mass, more preferably from 10 to 90 parts by mass, and still more preferably from 30 to 90 parts by mass, with respect to 100 parts by mass of the rubber components containing the modified conjugated diene polymer. If the blend amount of a rubber softener exceeds 100 parts by mass with respect to 100 parts by mass of the rubber components, bleed out is liable to occur, and there arises a risk that tackiness is caused on the composition surface, which is not preferable.

(Rubber Components Other than the Modified Conjugated Diene-based Polymer)

For the modified conjugated diene-based polymer composition according to the present embodiment, a rubbery polymer other than a modified conjugated diene-based polymer described above can be used as one of the rubber components in combination with the modified conjugated diene-based polymer.

Examples of such a rubbery polymer may include a conjugated diene-based polymer or a hydrogenated substance thereof, a random copolymer of a conjugated diene-based compound and a vinyl aromatic compound, or a hydrogenated substance thereof, a block copolymer of a conjugated diene-based compound and a vinyl aromatic compound, or a hydrogenated substance thereof, a non-diene-based polymer, and a natural rubber.

The rubbery polymer specifically may include butadiene rubber or a hydrogenated substance thereof, isoprene rubber or a hydrogenated substance thereof, styrene-butadiene rubber or a hydrogenated substance thereof, a styrene-butadiene block copolymer or a hydrogenated substance thereof, a styrenic elastomer such as a styrene-isoprene block copolymer or a hydrogenated substance thereof, and acrylonitrile-butadiene rubber or a hydrogenated substance thereof.

The non-diene-based polymer may include olefinic elastomers such as ethylene-propylene rubber, ethylene-propylene-diene rubber, ethylene-butene-diene rubber, ethylene-butene rubber, ethylene-hexene rubber and ethylene-octene rubber; butyl rubber, brominated butyl rubber, acrylic rubber, fluororubber, silicone rubber, chlorinated polyethylene rubber, epichlorohydrin rubber, $\alpha,\beta$-unsaturated nitrile-acrylic ester-conjugated diene copolymerized rubber, urethane rubber and polysulfide rubber.

The various rubbery polymers described above may be a modified rubber which has been imparted with a functional group.

These rubbery polymers may be used singly or in combination of two or more.

In the case where a rubbery polymer described above is incorporated to the modified conjugated diene-based polymer according to the present embodiment, and is used as one of the rubber components, the ratio of the modified conjugated diene polymer/the rubbery polymer described above is preferably 20/80 to 100/0, more preferably 30/70 to 90/10, and still more preferably 50/50 to 80/20.

For the modified conjugated diene-based polymer composition according to the present embodiment, various types of additives, such as softeners and fillers other than those described above, and further thermal stabilizers, antistatic agents, weather resistive stabilizers, age resisters, colorants and lubricants, may be used within the ranges not damaging the object of the present invention.

The filler specifically may include calcium carbonate, magnesium carbonate, aluminum sulfate and barium sulfate.

Examples of a softener to be blended as required in order to regulate the hardness and fluidity of target products may include fluid paraffin, castor oil and linseed oil.

As the thermal stabilizer, antistatic agent, weather resistive stabilizer, age resister, colorant and lubricant, known materials can be applied.

[Tire]

The modified conjugated diene-based polymer composition according to the present embodiment can be made into tires by vulcanization molding the composition according to the ordinary method. The composition can be used as various types of tire members, but preferably used particularly as tire tread materials.

EXAMPLES

Hereinafter, modified conjugated diene-based polymers and compositions using these will be described by way of specific Examples and Comparative Examples, but the present invention is not limited thereto.

[Analysis Methods of Samples]

The analyses of Samples A to R described later were carried out by the following methods.

(1) Bound Styrene Amount

A sample was made into a chloroform solution, and the bound styrene amount (% by mass) was measured by the absorption at UV 254 nm using a phenyl group of styrene. A measuring device used was UV-2450, made by Shimadzu Corp.

(2) Microstructure of Butadiene Moieties (1,2-vinyl Linkage Amount)

A sample was made into a carbon disulfide solution; an infrared spectrum was measured in a range of from 600 to 1,000 cm$^{-1}$ by using a solution cell to determine a microstructure of butadiene moieties according to the calculation formula of Hampton method from absorbances at predetermined wavenumbers. A measurement device used was FT-IR230, made by JASCO Corp.

(3) Mooney Viscosity

A sample was preheated at 100° C. for 1 min, and the viscosity after 4 min was measured according to JIS K 6300.

(4) Molecular Weight and Molecular Weight Distribution

A chromatogram was measured by GPC using a series of three columns each packed with polystyrenic gel; molecular weights (Mw, Mn) were determined from a calibration curve using standard polystyrenes; and the ratio of a lowest molecular weight peak area to the total peak area was calculated to obtain a lowest molecular weight peak area ratio.

An eluate used was tetrahydrofuran (THF).

The columns used were as follows: guard column: TOSOH TSKguardcolumn HHR-H, and columns: TOSOH TSKgel G6000HHR, TSKgel G5000HHR, TSKgel G4000HHR.

The molecular weight was measured under the conditions of an oven temperature of 40° C. and a THF flow rate of 1.0 mL/min and using an RI detector (HLC8020, made by Tosoh Corp.).

10 mg of a sample was dissolved in 20 mL of THF, and 200 µL thereof was injected for the measurement.

(5) Modification Ratio

By applying the characteristic in which a modified component is adsorbed in GPC column packed with a silica-based gel, and by using a sample solution containing a sample and a standard polystyrene (polystyrene is not adsorbed in the column) having a molecular weight of 5,000, both chromatograms of GPC of the above-mentioned polystyrenic gel column and GPC (made by Tosoh Corp., CCP8020 series, build-up type GPC system: AS-8020, SD-8022, CCPS, CO-8020, RI-8021) of silica-based columns (guard column: DIOL 4.6× 12.5 mm, 5 micron; columns: Zorbax PSM-1000S, PSM-300S, PSM-60S, oven temperature of 40° C., THF flow rate of 0.5 ml/min) were measured using an RI detector, and the adsorbed amount to the silica column was measured from the difference therebetween to determine a modification ratio thereof.

10 mg of the sample was dissolved in 20 mL of THF together with 5 mg of the standard polystyrene, and 200 µL of the solution was injected for the measurement.

The specific procedure involves: the total of peak areas of the chromatogram using the polystyrenic column was defined as 100, a sample peak area was denoted as P1, and a peak area of the standard polystyrene was denoted as P2; and the total of peak areas of the chromatogram using the silica-based column was defined as 100, a sample peak area was denoted as P3, and a peak area of the standard polystyrene was denoted as P4; then, the modification ratio (%) was calculated by the calculation formula of [1−(P2×P3)/(P1×P4)]×100.

(6) Glass Transition Temperature (Tg)

A DSC curve was recorded while the temperature was being raised from −100° C. at 10° C./min under a nitrogen atmosphere, and a middle point temperature of the glass transition was defined as a glass transition temperature.

[Polyfunctional Anionic Polymerization Initiator]

(Preparation of Polyfunctional Anionic Polymerization Initiators a to c, and e and f)

After an autoclave of 10 L in internal volume equipped with a stirring apparatus and a jacket were cleaned and dried, and the atmosphere inside was replaced by nitrogen, 1,3-butadiene, cyclohexane, tetrahydrofuran and divinylbenzene, which had been subjected to a drying treatment, were added thereto, n-butyllithium was then added, and they were reacted for 1 hour at 75° C., under the conditions shown in Table 1 shown below to prepare polyfunctional anionic polymerization initiators.

For the preparation of the polyfunctional anionic polymerization initiators, a divinylbenzene mixture (made by Nippon Steel Chemical Co., Ltd.) containing m-divinylbenzene, p-divinylbenzene, ethylvinylbenzene and the like, and having a divinylbenzene concentration of 57% by mass was used.

Since the divinylbenzene used was the commercially available divinylbenzene mixture described above, the divinylbenzene amount shown in Table 1 was expressed as a divinylbenzene net weight converted by removing the content of impurities.

TABLE 1

| Anionic Polymerization Initiator | | a | b | c | e | f |
|---|---|---|---|---|---|---|
| Divinylbenzene (DVB) | (g) | 21 | 42 | 84 | 127 | 232 |
| n-Butyllithium (NBL) | (g) | 104 | 104 | 104 | 104 | 104 |
| DVB/NBL | (molar ratio) | 0.10 | 0.20 | 0.40 | 0.60 | 1.10 |
| Butadiene | (g) | 1000 | 1000 | 1000 | 1000 | 1000 |
| Cyclohexane | (g) | 4800 | 4800 | 4800 | 4800 | 4800 |
| THF | (ppm) | 500 | 500 | 500 | 500 | 500 |

(Preparation of a Polyfunctional Anionic Polymerization Initiator d)

After a cooling tube and a dropping funnel were set on a three-way flask equipped with a magnet stirring bar, and the atmosphere inside was replaced by nitrogen, slightly pressurized nitrogen was circulated inside; and with the sealed state in the system, 99.0 mL (100 mmol) of a cyclohexane/n-hexane mixed solution of sec-butyllithium of 1.01 mol/L, 13.9 mL (100 mmol) of triethylamine and 10 mL of cyclohexane were introduced to the three-way flask, and stirred and mixed at 20° C.

Further, 7.91 g (50 mmol) of m-diisopropenylbenzene purified by reduced-pressure distillation was dropped thereto at room temperature over 3 hours, and continuously stirred for 15 hours to prepare a polyfunctional anionic polymerization initiator d.

[Styrene-Butadiene Copolymers: Production of Samples A to K]

Example 1

Sample A

An autoclave of 10 liters in internal volume equipped with a stirrer and a jacket and capable of being controlled in temperature was used as a reactor; 777 g of butadiene, 273 g of styrene, 4,800 g of cyclohexane, and 0.85 g of 2,2-bis(2-oxolanyl)propane as a polar substance, which all had been cleared of impurities in advance, were charged in the reactor; and the temperature inside the reactor was held at 42° C.

The polyfunctional polymerization initiator a prepared as described above was fed to the reactor so that the amount fed became 10.5 mmol in terms of the amount of lithium added.

After the start of the polymerization reaction, due to heat generation caused by the polymerization, the temperature inside the reactor started to rise, and the final temperature inside the reactor reached 75° C.

After the completion of the polymerization reaction, 5.25 mmol of 1-[3-(triethoxysilyl)propyl]-4-methylpiperazine was added to the reactor to carry out the modification reaction at a temperature condition of 74° C. and for 5 min.

After 2.1 g of an antioxidant (2,6-di-t-butyl-p-cresol: BHT) was added to the polymer solution, the solvent was removed by steam stripping, and the resultant was subjected to a drying treatment by a drier to obtain a styrene-butadiene copolymer having a modified component (Sample A).

As a result of analysis of Sample A, the bonded styrene amount was 26% by mass; and the bonded butadiene amount was 74% by mass.

The Mooney viscosity of Sample A was 55.

The 1,2-linkage amount of the microstructure of butadiene moieties, as determined by the calculation according to Hampton method from the measurement result using an infrared spectrophotometer, was 57%.

The modification ratio determined from GPC using the silica-based adsorption column was 88%.

The analysis results of (Sample A) are shown in Table 2 shown below.

Example 2

Sample B and

Example 3

Sample C

The kinds of the polyfunctional anionic polymerization initiators described above, the amounts thereof added, and the amounts of 2,2-bis(2-oxolanyl)propane and 1-[3-(triethoxysilyl)propyl]-4-methylpiperazine added were adjusted as shown in Table 2 shown below, and the production conditions used the same ones as in (Sample A) to obtain (Sample B) and (Sample C).

The analysis results of styrene-butadiene copolymers having a modified component, (Sample B) and (Sample C), are shown in Table 2 shown below.

Example 4

Sample D

An autoclave of 10 liters in internal volume equipped with a stirrer and a jacket and capable of being controlled in temperature was used as a reactor; 777 g of butadiene, 273 g of styrene, 4,800 g of cyclohexane, and 1.01 g of 2,2-bis(2-oxolanyl)propane as a polar substance, which all had been cleared of impurities in advance, were charged in the reactor; and the temperature inside the reactor was held at 42° C.

The polyfunctional anionic polymerization initiator d described above of 6.3 mmol in terms of the amount of lithium added, and 4.8 mmol of normal butyllithium were mixed, and the mixture was then fed to the reactor.

At this time, the ratio of the polyvinyl aromatic compound and lithium added to the polymerization system was 0.284.

After the start of the polymerization reaction, due to heat generation caused by the polymerization, the temperature inside the reactor started to rise, and the final temperature inside the reactor reached 74° C.

After the completion of the polymerization reaction, 6.93 mmol of 1-[3-(triethoxysilyl)propyl]-4-methylpiperazine was added to the reactor to carry out the modification reaction at a temperature condition of 73° C. and for 5 min.

After 2.1 g of an antioxidant (BHT) was added to the polymer solution, the solvent was removed by steam stripping, and the resultant was subjected to a drying treatment by a drier to obtain a styrene-butadiene copolymer having a modified component (Sample D).

The analysis results of (Sample D) are shown in Table 3 shown below.

Example 5

Sample E

Example 6

Sample F and

Example 7

Sample G

A styrene-butadiene copolymer was obtained using the polyfunctional anionic polymerization initiator b as in [Example 2 (Sample B)] described above, and then, the kinds of modifiers were altered as shown in Table 3 and Table 4 shown below to carry out the modification, to obtain styrene-butadiene copolymers having a modified component (Sample E to Sample G).

The analysis results of (Sample E) to (Sample G) are shown in Table 3 and Table 4 shown below.

Example 8

Sample H

The kind of the polyfunctional anionic polymerization initiator described above, the amount thereof added, and the amounts of 2,2-bis(2-oxolanyl)propane and 1-[3-(triethoxysilyl)propyl]-4-methylpiperazine added were adjusted as shown in Table 4 shown below, and the production conditions used the same ones as in [Example 1 (Sample A)] to obtain (Sample H).

The analysis results of a styrene-butadiene copolymer having a modified component, (Sample H), are shown in Table 4 shown below.

Comparative Example 1

Sample I

An autoclave of 10 liters in internal volume equipped with a stirrer and a jacket and capable of being controlled in temperature was used as a reactor; 777 g of butadiene, 273 g of styrene, 4,800 g of cyclohexane, and 0.62 g of 2,2-bis(2-oxolanyl)propane as a polar substance, which all had been cleared of impurities in advance, were charged in the reactor; and the temperature inside the reactor was held at 42° C.

A cyclohexane solution containing 7.5 mmol of n-butyllithium as a polymerization initiator was fed to the reactor.

After the start of the polymerization reaction, due to heat generation caused by the polymerization, the temperature inside the reactor started to rise, and the final temperature inside the reactor reached 71° C.

After the completion of the polymerization reaction, 0.28 mmol of tetraglycidyl-1,3-bisaminomethylcyclohexane was added to the reactor, and stirred at 70° C. for 2 min to carry out the modification reaction. Thereafter, 4.0 mmol of 1-[3-(triethoxysilyl)propyl]-4-methylpiperazine was further added thereto to carry out the modification reaction at 69° C. and for 5 min.

After 2.1 g of an antioxidant (BHT) was added to the polymer solution, the solvent was removed by steam stripping, and the resultant was subjected to a drying treatment by a drier to obtain a styrene-butadiene copolymer having modified components (Sample I).

The tetraglycidyl-1,3-bisaminomethylcyclohexane was a modifier having 4 reaction sites with living polymer ends, and was added in order to suppress the cold flow by making a part of a polymer macromolecular.

By contrast, in (Samples A to H), since use of a polyfunctional initiator had an effect of suppressing the cold flow because a part of a polymer became high molecular weight after the modification, there was no need for the modification by tetraglycidyl-1,3-bisaminomethylcyclohexane.

As a result of analysis of (Sample I), the bonded styrene amount was 26% by mass; and the bonded butadiene amount was 74%.

The Mooney viscosity of the polymer was 66.

The 1,2-linkage amount of the microstructure of butadiene moieties, as determined by the calculation according to Hampton method from the measurement result using an infrared spectrophotometer, was 56%, and the modification ratio determined from GPC using the silica-based adsorption column was 81%.

The analysis results of a styrene-butadiene copolymer having modified components (Sample I) are shown in Table 5 shown below.

Comparative Example 2

Sample J and

Comparative Example 3

Sample K

The kinds of the polyfunctional anionic polymerization initiators described above, the amounts thereof added, and the kinds and the mounts of 2,2-bis(2-oxolanyl)propane and modifiers added were adjusted as shown in Table 5 shown below, and the production conditions used the same ones as in [Example 1 (Sample A)] described above to obtain (Sample J) and (Sample K).

The analysis results of styrene-butadiene copolymers having a modified component, (Sample J) and (Sample K), are shown in Table 5 shown below.

Provided that *1 to *7 in Table 2 to Table 5 shown below indicate the following compounds.
*1: 2,2-bis(2-oxolanyl)propane
*2: tetraglycidyl-1,3-bisaminomethylcyclohexane
*3: 1-[3-(triethoxysilyl)propyl]-4-methylpiperazine
*4: 1-[3-(triethoxysilyl)propyl]-4-(trimethylsilyl)piperazine
*5: 2-[3-(trimethoxysilyl)propyl]-1,3-dimethylimidazolidine
*6: [3-(dimethylamino)propyl]trimethoxysilane
*7: 1,3-dimethyl-2-imidazolidinone

TABLE 2

| Sample No. | | Example 1 A | Example 2 B | Example 3 C |
|---|---|---|---|---|
| Butadiene | (g) | 777 | 777 | 777 |
| Styrene | (g) | 273 | 273 | 273 |
| Polyfunctional Initiator Kind | | a | b | c |
| Amount added (Li amount) | (mmol) | 10.5 | 13.7 | 20.5 |
| n-Butyllithium | (mmol) | — | — | — |
| Amount of polar substance added*1 | (g) | 0.85 | 1.09 | 1.68 |
| Amount of TGAMH added*2 | (mmol) | — | — | — |
| Amount of modifier-1 added*3 | (mmol) | 5.25 | 6.93 | 10.25 |
| Amount of modifier-2 added*4 | (mmol) | — | — | — |
| Amount of modifier-3 added*5 | (mmol) | — | — | — |
| Amount of modifier-4 added*6 | (mmol) | — | — | — |
| Amount of modifier-5 added*7 | (mmol) | — | — | — |
| Modification ratio | (%) | 88 | 92 | 95 |
| Mooney viscosity | | 55 | 61 | 66 |
| Bonded styrene amount | (%) | 26 | 26 | 26 |
| 1,2-Vinyl bond amount | (%) | 57 | 57 | 57 |
| Glass transition temperature | (° C.) | −28 | −28 | −28 |
| Weight-average molecular weight (Mw) | (thousand) | 378 | 395 | 424 |
| Number-average molecular weight (Mn) | (thousand) | 265 | 262 | 243 |
| Mw/Mn | | 1.43 | 1.51 | 1.74 |
| Ratio of the lowest molecular weight peak area | (%) | 50 | 42 | 31 |

TABLE 3

| Sample No. | | Example 4 D | Example 5 E | Example 6 F |
|---|---|---|---|---|
| Butadiene | (g) | 777 | 777 | 777 |
| Styrene | (g) | 273 | 273 | 273 |
| Polyfunctional Initiator Kind | | d | b | b |
| Amount added (Li amount) | (mmol) | 6.3 | 13.7 | 13.7 |
| n-Butyllithium | (mmol) | 4.8 | — | — |
| Amount of polar substance added*1 | (g) | 1.01 | 1.09 | 1.09 |
| Amount of TGAMH added*2 | (mmol) | — | — | — |
| Amount of modifier-1 added*3 | (mmol) | 6.93 | — | — |
| Amount of modifier-2 added*4 | (mmol) | — | 6.93 | — |
| Amount of modifier-3 added*5 | (mmol) | — | — | 6.93 |
| Amount of modifier-4 added*6 | (mmol) | — | — | — |
| Amount of modifier-5 added*7 | (mmol) | — | — | — |
| Modification ratio | (%) | 90 | 92 | 91 |
| Mooney viscosity | | 65 | 61 | 59 |
| Bonded styrene amount | (%) | 26 | 26 | 26 |
| 1,2-Vinyl bond amount | (%) | 57 | 57 | 57 |

TABLE 3-continued

|  |  | Example 4 | Example 5 | Example 6 |
|---|---|---|---|---|
| Glass transition temperature | (° C.) | −28 | −28 | −28 |
| Weight-average molecular weight (Mw) | (thousand) | 401 | 392 | 395 |
| Number-average molecular weight (Mn) | (thousand) | 258 | 252 | 258 |
| Mw/Mn |  | 1.55 | 1.56 | 1.53 |
| Ratio of the lowest molecular weight peak area | (%) | 36 | 44 | 41 |

TABLE 4

|  |  | Example 7 | Example 8 |
|---|---|---|---|
| Sample No. |  | G | H |
| Butadiene | (g) | 777 | 777 |
| Styrene | (g) | 273 | 273 |
| Polyfunctional Initiator Kind |  | b | e |
| Amount added (Li amount) | (mmol) | 13.7 | 28.9 |
| n-Butyllithium | (mmol) | — | — |
| Amount of polar substance added*1 | (g) | 1.09 | 2.31 |
| Amount of TGAMH added*2 | (mmol) | — | — |
| Amount of modifier-1 added*3 | (mmol) | — | 14.5 |
| Amount of modifier-2 added*4 | (mmol) | — | — |
| Amount of modifier-3 added*5 | (mmol) | — | — |
| Amount of modifier-4 added*6 | (mmol) | 6.93 | — |
| Amount of modifier-5 added*7 | (mmol) | — | — |
| Modification ratio | (%) | 93 | 96 |
| Mooney viscosity |  | 64 | 62 |
| Bonded styrene amount | (%) | 26 | 26 |
| 1,2-Vinyl bond amount | (%) | 57 | 56 |
| Glass transition temperature | (° C.) | −28 | −29 |
| Weight-average molecular weight (Mw) | (thousand) | 411 | 398 |
| Number-average molecular weight (Mn) | (thousand) | 266 | 227 |
| Mw/Mn |  | 1.55 | 1.75 |
| Ratio of the lowest molecular weight peak area | (%) | 39 | 24 |

TABLE 5

|  |  | Comparative Example 1 | Comparative Example 2 | Comparative Example 3 |
|---|---|---|---|---|
| Sample No. |  | I | J | K |
| Butadiene | (g) | 777 | 777 | 777 |
| Styrene | (g) | 273 | 273 | 273 |
| Polyfunctional Initiator Kind |  | — | f | b |
| Amount added (Li amount) | (mmol) | — | 54.3 | 15.1 |
| n-Butyllithium | (mmol) | 7.5 | — | — |
| Amount of polar substance added*1 | (g) | 0.62 | 4.38 | 1.21 |
| Amount of TGAMH added*2 | (mmol) | 0.28 | — | — |
| Amount of modifier-1 added*3 | (mmol) | 4.00 | 27.2 | — |
| Amount of modifier-2 added*4 | (mmol) | — | — | — |
| Amount of modifier-3 added*5 | (mmol) | — | — | — |
| Amount of modifier-4 added*6 | (mmol) | — | — | — |
| Amount of modifier-5 added*7 | (mmol) | — | — | 15.1 |
| Modification ratio | (%) | 81 | 97 | 90 |
| Mooney viscosity |  | 66 | 60 | 56 |
| Bonded styrene amount | (%) | 26 | 26 | 26 |
| 1,2-Vinyl bond amount | (%) | 56 | 56 | 57 |
| Glass transition temperature | (° C.) | −29 | −28 | −28 |
| Weight-average molecular weight (Mw) | (thousand) | 390 | 388 | 256 |
| Number-average molecular weight (Mn) | (thousand) | 291 | 208 | 178 |
| Mw/Mn |  | 1.34 | 1.87 | 1.44 |
| Ratio of the lowest molecular weight peak area | (%) | 68 | 18 | 62 |

[Production of Rubber Compositions]

Examples 9 to 15, and Comparative Examples 4 to 6

The samples (Sample A to Sample K) shown in Table 2 to Table 5 shown above were used as raw material rubbers, and according to the formulations described below, rubber compositions containing the respective raw material rubbers were obtained.

Modified conjugated diene polymers (Sample A to Sample K): 70.0 parts by mass
Natural rubber (whose Mooney viscosity was adjusted to 60 by mastication): 30.0 parts by mass
Silica (Ultrasil VN3, made by Evonik Degussa GmbH): 75.0 parts by mass
Carbon black (Seast KH(N339), made by Tokai Carbon Co., Ltd.): 5.0 parts by mass
Silane coupling agent (Si69, made by Evonik Degussa GmbH): 7.5 parts by mass
S-RAE oil (JOMO Process NC140, made by Japan Energy Corp.): 37.5 parts by mass
Zinc oxide: 2.5 parts by mass
Stearic acid: 2.0 parts by mass
Antioxidant (N-isopropyl-N'-phenyl-p-phenylenediamine): 2.0 parts by mass
Sulfur: 1.7 parts by mass
Vulcanization accelerator (N-cyclohexyl-2-benzothiazylsulfinamide): 1.7 parts by mass
Vulcanization accelerator (diphenylguanidine): 1.5 parts by mass
The total: 236.4 parts by mass The rubber compositions were each kneaded by the following method.

A sealed kneader (internal capacity: 0.3 L) equipped with a temperature control device was used. As a first stage kneading, the raw material rubbers (Sample A to Sample H, natural rubber), the fillers (silica, carbon black), the organic silane coupling agent, the process oil, the zinc oxide and the stearic acid were kneaded under the conditions of a filling ratio of 65% and a rotor rotational speed of 50/57 rpm.

At this time, the temperature of the kneader was controlled, and a rubber composition was obtained at a discharge temperature (rubber compound) of from 155 to 160° C.

Then, as a second stage kneading, after the rubber compound obtained as described above was cooled to room temperature, the antioxidant was added thereto, and the mixture was again kneaded to improve the dispersion of the silica. Also in this case, the discharge temperature (rubber compound) was regulated at 155 to 160° C. by the temperature control of the kneader.

After cooling, as a third stage kneading, the sulfur and the vulcanization accelerator were added thereto and kneaded by an open roll set at 70° C.

Thereafter, the rubber compound was molded, and vulcanized at 160° C. for 20 min by a vulcanization press.

After the vulcanization, physical properties of the rubber composition were measured.

The measurement results of the physical properties are shown in Table 6 to Table 8 shown below.

Each physical property of the rubber composition was measured by the method described below.

<Bound Rubber Content>

About 0.2 g of the rubber compound after the completion of the second stage kneading step was cut into a square of about 1 mm, put in a Harris cage (made of 100-mesh metal gauze), and weighed.

Thereafter, the rubber compound was immersed in toluene for 24 hours, thereafter subjected to a drying treatment, and weighed.

The amount of the rubber (the modified conjugated diene-based polymer+the natural rubber) bound to the fillers was calculated from the amount of undissolved components, and the proportion of the rubber bound to the fillers to the rubber amount in the original rubber compound was determined.

<Compound Mooney Viscosity>

The viscosity was measured by using a Mooney viscometer and according to JIS K6300-1. After the rubber compound after the third stage kneading step was preheated at 130° C. for 1 min, the rotor was rotated at 2 rpm, and the viscosity after 4 min was measured.

<Tensile Strength>

The tensile strength of a vulcanized test piece was measured by the tensile test method according to JIS K6251. A larger index value indicates a better fracture resistance.

<Viscoelasticity Parameter>

The viscoelasticity parameter of a vulcanized test piece was measured using a viscoelasticity tester (ARES, made by Rheometrics Scientific, Inc.) on a torsion mode.

Tan $\delta$ measured at 0° C. at a frequency of 10 Hz and a strain of 1% was defined as an index of the wet grip performance. A larger index value indicates a better wet grip performance.

Tan $\delta$ measured at 50° C. at a frequency of 10 Hz and a strain of 3% was defined as an index of the fuel-efficiency characteristic. A smaller index value indicates a better fuel-efficiency performance.

$\Delta G'$, representing a difference in the storage modulus (G') between at strains of 0.1% and 10%, was defined as an index of the Payne effect. A smaller index value indicates a better dispersibility of the fillers such as silica.

<Abrasion Resistance>

The abrasion amount of a vulcanized test piece was measured using an Akron abrasion tester and according to JIS K6264-2, and at a load of 4.1 N and at 1,000 rotations, and was indexed.

A larger index value indicates a better abrasion resistance.

TABLE 6

|  |  |  | Example 9 | Example 10 | Example 11 | Example 12 |
|---|---|---|---|---|---|---|
| Modified conjugated diene-based polymer |  |  | A | B | C | D |
| Compound Mooney viscosity |  |  | 44 | 50 | 60 | 55 |
| Bound rubber content (%) |  |  | 70 | 74 | 81 | 75 |
| Physical properties of vulcanizate | Tensile strength | index | 101 | 100 | 99 | 95 |
|  | Abrasion resistance | index | 108 | 113 | 120 | 115 |
|  | Tan$\delta$ at 0° C. (strain of 1%) | index | 103 | 105 | 104 | 107 |
|  | Tan$\delta$ at 50° C. (strain of 3%) | index | 77 | 67 | 60 | 66 |
|  | $\Delta G'$ (strain of 3%) | index | 70 | 42 | 37 | 42 |

TABLE 7

|  |  |  | Example 13 | Example 14 | Example 15 | Example 16 |
|---|---|---|---|---|---|---|
| Modified conjugated diene-based polymer |  |  | E | F | G | H |
| Compound Mooney viscosity |  |  | 51 | 48 | 45 | 88 |
| Bound rubber content (%) |  |  | 75 | 72 | 71 | 84 |
| Physical properties of vulcanizate | Tensile strength | index | 101 | 100 | 101 | 94 |
|  | Abrasion resistance | index | 115 | 110 | 107 | 112 |
|  | Tan$\delta$ at 0° C. (strain of 1%) | index | 105 | 103 | 103 | 106 |
|  | Tan$\delta$ at 50° C. (strain of 3%) | index | 64 | 71 | 77 | 69 |
|  | $\Delta G'$ (strain of 3%) | index | 38 | 48 | 55 | 45 |

TABLE 8

|  |  |  | Comparative Example 4 | Comparative Example 5 | Comparative Example 6 |
|---|---|---|---|---|---|
| Modified conjugated diene-based polymer |  |  | I | J | K |
| Mooney viscosity of mixed rubber compound |  |  | 36 | 130 | 45 |
| Bound rubber content (%) |  |  | 63 | 88 | 54 |
| Physical properties of vulcanizate | Tensile strength | index | 100 | 91 | 94 |
|  | Abrasion resistance | index | 100 | 102 | 89 |
|  | Tanδ at 0° C. (strain of 1%) | index | 100 | 105 | 95 |
|  | Tanδ at 50° C. (strain of 3%) | index | 100 | 92 | 106 |
|  | ΔG' (strain of 3%) | index | 100 | 82 | 114 |

When the modified conjugated diene-based polymer compositions of Examples 9 to 16 using (Samples A to H) shown in Table 6 and Table 7 above were compared with the composition of Comparative Example 4 using Sample I and the composition of Comparative Example 6 using Sample K shown in Table 8 above, it was found that in the silica-blended compositions, the bound rubber content increased, and the Payne effect was small, so the dispersibility of the silica was excellent; and tan δ at a high temperature was largely reduced, so the hysteresis loss was small, and a low rolling resistance of the tire was achieved, thus providing an excellent fuel efficiency.

It was also found that tan δ at a low temperature was high, so the wet skid resistance was good, and a balance between the low fuel consumption and the wet skid resistance was good.

The abrasion resistance was greatly improved, and the tensile strength was good.

Therefore, it has been found that the modified conjugated diene-based polymer according to the present invention has a performance balance superior to polymers obtained by known technologies.

Further, the composition of Comparative Example 5 using Sample J, which was a polymer obtained by polymerization using a polyfunctional initiator having a higher (polyvinyl aromatic compound/lithium) ratio than the range according to the present invention, had a high viscosity of the rubber compound, and exhibited deteriorated processability. The low fuel consumption, abrasion resistance and tensile strength had results inferior to the cases of Examples in which the (polyvinyl aromatic compound/lithium) ratio was in the range according to the present invention, due to faulty kneading due to the deteriorated processability. Therefore, it has been found that the (polyvinyl aromatic compound/lithium) ratio has a large influence on the processability and the performance balance.

[Production of Rubber Compositions]

Examples 17 to 23, and Comparative Example 7

Rubber compositions were obtained using the samples (Sample A to Sample G, and Sample I) shown in Table 2 to Table 5 shown above as raw material rubbers, and according to formulations shown below.
Modified conjugated diene-based polymers (Samples A to G and I): 100.0 parts by mass
Silica (Ultrasil VN3, made by Evonik Degussa GmbH): 25.0 parts by mass
Carbon black (Seast KH(N339), made by Tokai Carbon Co., Ltd.): 20.0 parts by mass
Silane coupling agent (Si69, made by Evonik Degussa GmbH): 2.5 parts by mass
S-RAE oil (JOMO Process NC140, made by Japan Energy Corp.): 5.0 parts by mass
Zinc oxide: 3.0 parts by mass
Stearic acid: 2.0 parts by mass
Antioxidant (N-isopropyl-N'-phenyl-p-phenylenediamine): 1.0 part by mass
Sulfur: 1.9 parts by mass
Vulcanization accelerator (N-cyclohexyl-2-benzothiazylsulfinamide): 1.0 part by mass
Vulcanization accelerator (diphenylguanidine): 1.5 parts by mass
The total: 162.9 parts by mass A kneading step, and a molding and vulcanization step were carried out as in Examples 9 to 16 and Comparative Examples 4 to 6 described above.

After the vulcanization, physical properties of the rubber compositions were measured.

The measurement results of the physical properties are shown in Table 9 and Table 10 shown below.

TABLE 9

|  |  |  | Example 17 | Example 18 | Example 19 | Example 20 |
|---|---|---|---|---|---|---|
| Modified conjugated diene-based polymer |  |  | A | B | C | D |
| Compound Mooney viscosity |  |  | 79 | 85 | 88 | 87 |
| Bound rubber content (%) |  |  | 70 | 73 | 75 | 73 |
| Physical properties of vulcanizate | Tensile strength | index | 103 | 101 | 101 | 102 |
|  | Abrasion resistance | index | 108 | 115 | 118 | 115 |
|  | Tanδ at 0° C. (strain of 1%) | index | 102 | 103 | 104 | 103 |

TABLE 9-continued

|  |  | Example 17 | Example 18 | Example 19 | Example 20 |
|---|---|---|---|---|---|
| Tanδ at 50° C. (strain of 3%) | index | 89 | 82 | 75 | 79 |
| ΔG' (strain of 3%) | index | 80 | 66 | 50 | 61 |

TABLE 10

|  |  |  | Example 21 | Example 22 | Example 23 | Comparative Example 7 |
|---|---|---|---|---|---|---|
| Modified conjugated diene-based polymer |  |  | E | F | G | I |
| Compound Mooney viscosity |  |  | 86 | 83 | 81 | 74 |
| Bound rubber (%) content |  |  | 74 | 71 | 68 | 67 |
| Physical properties of vulcanizate | Tensile strength | index | 102 | 101 | 100 | 100 |
|  | Abrasion resistance | index | 117 | 113 | 107 | 100 |
|  | Tanδ at 0° C. (strain of 1%) | index | 103 | 100 | 98 | 100 |
|  | Tanδ at 50° C. (strain of 3%) | index | 77 | 87 | 95 | 100 |
|  | ΔG' (strain of 3%) | index | 58 | 70 | 92 | 100 |

It was found as shown in Table 9 and Table 10 shown above that in the modified conjugated diene-based polymer compositions of Examples 17 to 23 using (Samples A to G) described above, even in the case where the silica and the carbon black were blended in nearly equal amounts, the bound rubber content was large, and the Payne effect was small, so the dispersibility of the silica was excellent; and tan δ at a high temperature was low, so the hysteresis loss was small, and the rolling resistance of the tire was low, thus effecting an excellent low fuel consumption.

It was also found that the low fuel consumption and the wet skid resistance exhibited an excellent balance.

Further, the abrasion resistance and the tensile strength were good also.

[Production of a Butadiene Polymer]

Example 24

Sample L

An autoclave of 10 L in internal volume equipped with a stirrer and a jacket and capable of being controlled in temperature was used as a reactor; 920 g of butadiene, 4,830 g of cyclohexane, and 0.017 g of 2,2-bis(2-oxolanyl)propane as a polar substance, which all had been cleared of impurities in advance, were charged in the reactor; and the temperature inside the reactor was held at 55° C.

The polyfunctional initiator a prepared as described above was fed to the reactor so that the amount fed became 10.5 mmol in terms of the amount of lithium added.

After the start of the reaction, due to heat generation caused by the polymerization, the temperature inside the reactor started to rise, and the final temperature inside the reactor reached 84° C.

After the completion of the polymerization reaction, 5.25 mmol of 1-[3-(triethoxysilyl)propyl]-4-methylpiperazine was added to the reactor to carry out the modification reaction at a temperature condition of 83° C. and for 5 min.

After 2.1 g of an antioxidant (2,6-di-tert-butyl-p-cresol: BHT) was added to the polymer solution, the solvent was removed by steam stripping, and the resultant was subjected to a drying treatment by a drier to obtain a butadiene polymer having a modified component (Sample L).

The analysis results of Sample L are shown in Table 11 shown below.

Example 25

Sample M and

Example 26

Sample N

The kinds of the polyfunctional anionic polymerization initiators described above, the amounts thereof added, and the amounts of 2,2-bis(2-oxolanyl)propane and 1-[3-(triethoxysilyl)propyl]-4-methylpiperazine added were altered as shown in Table 11 shown below.

Other conditions were the same ones as in Example 24 to carry out the polymerization reaction to obtain butadiene polymers having a modified component (Samples M and N).

The analysis results of Samples M and N are shown in Table 11 shown below.

Example 27

Sample O and

Example 28

Sample P

The kind of the modifier was altered, and other conditions were the same ones as in Example 25 to obtain butadiene polymers having a modified component (Sample O and Sample P).

The analysis results of Samples O and P are shown in Table 12 shown below.

[Production of a Styrene-Butadiene Polymer for Blend]

Production Example 1

Sample Q

An autoclave of 10 L in internal volume equipped with a stirrer and a jacket and capable of being controlled in temperature was used as a reactor; 777 g of butadiene, 273 g of styrene, 4,800 g of cyclohexane, and 0.48 g of 2,2-bis(2-oxolanyl)propane as a polar substance, which all had been cleared of impurities in advance, were charged in the reactor; and the temperature inside the reactor was held at 42° C.

A cyclohexane solution containing 5.8 mmol of n-butyllithium as a polymerization initiator was fed to the reactor.

After the start of the polymerization, due to heat generation caused by the polymerization, the temperature inside the reactor started to rise, and the final temperature inside the reactor reached 73° C. After the completion of the polymerization reaction, 6.38 mmol of methanol was added to the reactor to terminate the reaction.

After 2.1 g of an antioxidant (BHT) was added to the polymer solution, the solvent was removed by steam stripping, and the resultant was subjected to a drying treatment by a drier to obtain an unmodified styrene-butadiene copolymer (Sample Q).

The analysis results of Sample Q are shown in Table 13 shown below.

Production Example 2

Sample R

The amount of n-butyllithium was altered to 7.5 mmol, and the amount of 2,2-bis(2-oxolanyl)propane was altered to 0.62 g.

Other conditions were the same ones as in Production Example 1 to carry out the polymerization reaction.

After the start of the polymerization, due to heat generation caused by the polymerization, the temperature inside the reactor started to rise, and the final temperature inside the reactor reached 73° C.

After the completion of the polymerization reaction, 5.0 mmol of 1-[3-(triethoxysilyl)propyl]-4-methylpiperazine was added to the reactor to carry out the modification reaction at a temperature condition of 72° C. and for 5 min to obtain a styrene-butadiene copolymer having a modified component (Sample R).

The analysis results of Sample R are shown in Table 13 shown below.

In Table 11 to Table 13 shown below, *1, 3, 5 and 6 indicate the following compounds.

*1: 2,2-bis(2-oxolanyl)propane
*3: 1-[3-(triethoxysilyl)propyl]-4-methylpiperazine
*5: 2-[3-(trimethoxysilyl)propyl]-1,3-dimethylimidazolidine
*6: [3-(dimethylamino)propyl]trimethoxysilane

TABLE 11

|  |  | Example 24 | Example 25 | Example 26 |
|---|---|---|---|---|
| Sample No. |  | L | M | N |
| Butadiene | (g) | 920 | 920 | 920 |
| Styrene | (g) | — | — | — |
| Polyfunctional Initiator Kind |  | a | b | c |
| Amount added (Li amount) | (mmol) | 10.5 | 13.7 | 20.5 |
| n-Butyllithium | (mmol) | — | — | — |
| Amount of polar substance added*1 | (g) | 0.017 | 0.023 | 0.034 |
| Amount of modifier-1 added*3 | (mmol) | 5.25 | 6.93 | 10.25 |
| Amount of modifier-3 added*5 | (mmol) | — | — | — |
| Amount of modifier-4 added*6 | (mmol) | — | — | — |
| Modification ratio | (%) | 87 | 90 | 93 |
| Mooney viscosity |  | 58 | 62 | 65 |
| Bonded styrene amount | (%) | 0 | 0 | 0 |
| 1,2-Vinyl bond amount | (%) | 18 | 18 | 18 |
| Weight-average molecular weight (Mw) | (thousand) | 421 | 428 | 434 |
| Number-average molecular weight (Mn) | (thousand) | 298 | 288 | 279 |
| Mw/Mn |  | 1.41 | 1.49 | 1.56 |
| Ratio of the lowest molecular weight peak area | (%) | 48 | 38 | 30 |

TABLE 12

|  |  | Example 27 | Example 28 |
|---|---|---|---|
| Sample No. |  | O | P |
| Butadiene | (g) | 920 | 920 |
| Styrene | (g) | — | — |
| Polyfunctional Initiator Kind |  | b | b |
| Amount added (Li amount) | (mmol) | 13.7 | 13.7 |
| n-Butyllithium | (mmol) | — | — |
| Amount of polar substance added*1 | (g) | 0.023 | 0.023 |
| Amount of modifier-1 added*3 | (mmol) | — | — |
| Amount of modifier-3 added*5 | (mmol) | 6.93 | — |
| Amount of modifier-4 added*6 | (mmol) | — | 6.93 |
| Modification ratio | (%) | 89 | 92 |
| Mooney viscosity |  | 64 | 66 |
| Bonded styrene amount | (%) | 0 | 0 |
| 1,2-Vinyl bond amount | (%) | 18 | 18 |
| Weight-average molecular weight (Mw) | (thousand) | 431 | 443 |
| Number-average molecular weight (Mn) | (thousand) | 292 | 302 |
| Mw/Mn |  | 1.48 | 1.47 |
| Ratio of the lowest molecular weight peak area | (%) | 39 | 40 |

TABLE 13

|  |  | Production Example 1 | Production Example 2 |
|---|---|---|---|
| Sample No. |  | Q | R |
| Butadiene | (g) | 777 | 777 |
| Styrene | (g) | 273 | 273 |
| Polyfunctional Initiator Kind |  | — | — |
| Amount added (Li amount) | (mmol) | — | — |
| n-Butyllithium | (mmol) | 5.8 | 7.5 |
| Amount of polar substance added*1 | (g) | 0.48 | 0.62 |
| Amount of modifier-1 added*3 | (mmol) | — | 5.00 |
| Amount of modifier-3 added*5 | (mmol) | — | — |
| Amount of modifier-4 added*6 | (mmol) | — | — |
| Modification ratio | (%) | — | 82 |
| Mooney viscosity |  | 48 | 50 |
| Bonded styrene amount | (%) | 26 | 26 |
| 1,2-Vinyl bond amount | (%) | 57 | 57 |
| Weight-average molecular weight (Mw) | (thousand) | 373 | 283 |
| Number-average molecular weight (Mn) | (thousand) | 359 | 232 |
| Mw/Mn |  | 1.04 | 1.22 |
| Ratio of the lowest molecular weight peak area | (%) | 100 | 69 |

[Production of Rubber Compositions]

Examples 29 to 32, and Comparative Example 8

Rubber compositions were obtained according to the following formulations where (Samples L to N) shown in Table 11 shown above were denoted as the modified diene-based polymer component (A) according to the present invention, and a high-cis polybutadiene and (Samples Q and R) shown in Table 13 shown above were denoted as polymer components other than the (A), as (B).

The rubber component described below was the total of (A) component and (B) component.

The mass ratio of (A) component and (B) component are shown in Table 14 and Table 15 shown below.

Rubber component (the total of (A) component and (B) component): 100.0 parts by mass
Silica (Ultrasil VN3, made by Evonik Degussa GmbH): 75.0 parts by mass
Carbon black (Seast KH(N339), made by Tokai Carbon Co., Ltd.): 5.0 parts by mass
Silane coupling agent (Si69, made by Evonik Degussa GmbH): 7.5 parts by mass
S-RAE oil (JOMO Process NC140, made by Japan Energy Corp.): 37.5 parts by mass
Zinc oxide: 2.5 parts by mass
Stearic acid: 2.0 parts by mass
Antioxidant (N-isopropyl-N'-phenyl-p-phenylenediamine): 2.0 parts by mass
Sulfur: 1.7 parts by mass
Vulcanization accelerator (N-cyclohexyl-2-benzothiazylsulfinamide): 1.7 parts by mass
Vulcanization accelerator (diphenylguanidine): 1.5 parts by mass
The total: 236.4 parts by mass The kneading step, and the molding and vulcanizing step were carried out as in the production process of the rubber compositions in Examples 9 to 16 and Comparative Examples 4 to 6 described above.

After the vulcanization, physical properties of the rubber compositions were measured.

The measurement results of the physical properties are shown in Table 14 and Table 15 shown below.

TABLE 14

|  |  |  | Example 29 | Example 30 | Example 31 |
|---|---|---|---|---|---|
| Rubber component (A) (parts by mass) | L |  | 30 | — | — |
|  | M |  | — | 30 | — |
|  | N |  | — | — | 20 |
| Rubber component (B) (parts by mass) | High-cis polybutadiene |  | — | — | — |
|  | Q |  | — | — | — |
|  | R |  | 70 | 70 | 80 |
| Compound Mooney viscosity |  |  | 75 | 80 | 84 |
| Bound rubber content (%) |  |  | 60 | 68 | 70 |
| Physical properties of vulcanizate | Tensile strength | index | 100 | 98 | 97 |
|  | Abrasion resistance | index | 101 | 102 | 106 |
|  | Tanδ at 0° C. (strain of 1%) | index | 104 | 106 | 105 |
|  | Tanδ at 50° C. (strain of 3%) | index | 61 | 58 | 55 |

TABLE 15

|  |  |  | Example 32 | Comparative Example 8 |
|---|---|---|---|---|
| Rubber component (A) (parts by mass) | L |  | — | — |
|  | M |  | 30 | — |
|  | N |  | — | — |
| Rubber component (B) (parts by mass) | High-cis polybutadiene |  | — | 30 |
|  | Q |  | 70 | 70 |
|  | R |  | — | — |
| Compound Mooney viscosity |  |  | 65 | 53 |
| Bound rubber content (%) |  |  | 57 | 40 |
| Physical properties of vulcanizate | Tensile strength | index | 100 | 100 |
|  | Abrasion resistance | index | 105 | 100 |
|  | Tanδ at 0° C. (strain of 1%) | index | 103 | 100 |
|  | Tanδ at 50° C. (strain of 3%) | index | 63 | 100 |

In Table 14 and Table 15, a high-cis polybutadiene used was UBEPOL BR150, made by UBE Industries, Ltd.

As shown in Table 14 and Table 15 shown above, it was found from the low tan δ at 50° C. (low hysteresis loss) that the modified conjugated diene-based polymer compositions in Examples 29 to 32 had a low rolling resistance of the tire, and exhibited an excellent fuel-efficiency performance.

It was found from the high tan δ at 0° C. that the modified conjugated diene-based polymer compositions in Examples 29 to 32 also exhibited an excellent wet skid resistance performance.

From the above, it has been found that the modified conjugated diene-based polymer compositions according to the present Examples exhibited a good balance between the rolling resistance performance and the wet skid resistance performance, and further had a good abrasion resistance and tensile strength.

Examples 33 to 37 and Comparative Example 9

Rubber compositions were obtained according to the following formulations where Sample M shown in Table 11 shown above and Samples O and P shown in Table 12 shown above were denoted as the modified diene polymer component, as (A) component, according to the present invention, and a natural rubber and a high-cis polybutadiene were denoted as (B) component.

The rubber component described below was the total of (A) component and (B) component.

The mass ratio of (A) component and (B) component are shown in Table 16 and Table 17 shown below. Rubber component (the total of (A) component and (B) component): 100.0 parts by mass
Silica (Ultrasil VN3, made by Evonik Degussa GmbH): 35.0 parts by mass
Carbon black (Seast KH(N339), made by Tokai Carbon Co., Ltd.): 15.0 parts by mass
Silane coupling agent (Si69, made by Evonik Degussa GmbH): 2.8 parts by mass
S-RAE oil (JOMO Process NC140, made by Japan Energy Corp.): 20.0 parts by mass
Zinc oxide: 3.0 parts by mass
Stearic acid: 2.0 parts by mass
Antioxidant (N-isopropyl-N'-phenyl-p-phenylenediamine): 1.0 part by mass
Sulfur: 1.7 parts by mass
Vulcanization accelerator (N-cyclohexyl-2-benzothiazylsulfinamide): 1.5 parts by mass
Vulcanization accelerator (diphenylguanidine): 1.0 part by mass
The total: 183.0 parts by mass The kneading step, and the molding and vulcanizing steps were carried out as in the production process of the rubber compositions in Examples 9 to 16 and Comparative Examples 4 to 6 described above.

After the vulcanization, physical properties of the rubber compositions were measured.

The measurement results of the physical properties are shown in Table 16 and Table 17 shown below.

In this evaluation, a viscoelasticity tester (ARES), made by Rheometrics Scientific Inc., was used, and G' (storage modulus) at −20° C. of a vulcanized test piece was measured at a frequency of 10 Hz and a strain of 0.1% in a torsion mode, and was used as an index for the low-temperature performance.

A smaller index value indicates a better low-temperature performance.

TABLE 16

| | | | Example 33 | Example 34 | Example 35 |
|---|---|---|---|---|---|
| Rubber component (A) (parts by mass) | M | | 50 | — | — |
| | O | | — | 50 | — |
| | P | | — | — | 50 |
| Rubber component (B) (parts by mass) | Natural rubber | | 50 | 50 | 50 |
| | High-cis polybutadiene | | — | — | — |
| Compound Mooney viscosity | | | 68 | 66 | 69 |
| Bound rubber content (%) | | | 66 | 63 | 62 |
| Physical properties of vulcanizate | Tensile strength | index | 101 | 100 | 102 |
| | Abrasion resistance | index | 108 | 105 | 101 |
| | G' at −20° C. (strain of 0.1%) | index | 96 | 97 | 99 |
| | Tan δ at 50° C. (strain of 3%) | index | 65 | 68 | 72 |

TABLE 17

| | | | Example 36 | Example 37 | Comparative Example 9 |
|---|---|---|---|---|---|
| Rubber component (A) (parts by mass) | M | | 100 | 50 | — |
| | O | | — | — | — |
| | P | | — | — | — |
| Rubber component (B) (parts by mass) | Natural rubber | | — | — | 50 |
| | High-cis polybutadiene | | — | 50 | 50 |
| Compound Mooney viscosity | | | 83 | 65 | 45 |
| Bound rubber content (%) | | | 69 | 57 | 38 |
| Physical properties of vulcanizate | Tensile strength | index | 92 | 103 | 100 |
| | Abrasion resistance | index | 93 | 110 | 100 |
| | G' at −20° C. (strain of 0.1%) | index | 93 | 92 | 100 |
| | Tan δ at 50° C. (strain of 3%) | index | 51 | 63 | 100 |

In Table 16 and Table 17, a high-cis polybutadiene used was UBEPOL BR150, made by UBE Industries, Ltd., and a natural rubber used was RSS#3.

As shown in Table 16 and Table 17 shown above, it was found from the low tan δ at 50° C. (low hysteresis loss) that the modified conjugated diene-based polymer compositions in Examples 33 to 37 had a low rolling resistance of the tire, and exhibited an excellent fuel-efficiency performance.

It was confirmed from the low G' at −20° C. that the modified conjugated diene-based polymer compositions in Examples 33 to 37 also exhibited an excellent low-temperature performance.

From the above, it has been found that the modified conjugated diene-based polymer compositions in Examples 33 to 37 exhibited a good balance between the rolling resistance performance and the low-temperature performance, and further had a good abrasion resistance and tensile strength.

The present application is based on Japanese Patent Application No. 2008-265434, filed on Oct. 14, 2008, with Japan Patent Office, and Japanese Patent Application No. 2009-186603, filed on Aug. 11, 2009, with Japan Patent Office, the contents of which are incorporated herein by reference.

INDUSTRIAL APPLICABILITY

Compositions of the modified conjugated diene-based polymer according to the present invention in combination with inorganic fillers have the industrial applicability in the fields of interior and exterior trim parts of automobiles, rubber vibration isolators, belts, footwear, foams, various types of industrial parts, tire applications and the like.

The invention claimed is:

1. A modified conjugated diene-based polymer having a silyl group substituted with one or more alkoxy groups, and one or more nitrogen atoms on the chain ends of the conjugated diene-based polymer, the modified conjugated diene-based polymer being obtained by polymerizing a conjugated diene compound, or copolymerizing a conjugated diene compound with an aromatic vinyl compound, by using a polyfunctional anionic polymerization initiator prepared from a polyvinyl aromatic compound and an organolithium compound in a range of a molar ratio (the polyvinyl aromatic compound/the organolithium compound) of from 0.05 to 1.0, so as to obtain the conjugated diene-based polymer, and by reacting a living polymer end of the conjugated diene-based polymer with a compound having a silyl group substituted with two or more alkoxy groups, and one or more nitrogen atoms.

2. The modified conjugated diene-based polymer according to claim 1, wherein a modification ratio determined by an amount adsorbed onto a column of gel permeation chromatography measurement using silica particle-packed column is 78% by mass or more.

3. The modified conjugated diene-based polymer according to claim 1, wherein a molar ratio of the polyvinyl aromatic compound to the organolithium compound is in a range of from 0.1 to 0.45.

4. The modified conjugated diene-based polymer according to claim 1, wherein the compound having the silyl group substituted with two or more alkoxy groups, and one or more nitrogen atoms is represented by the following formula (1):

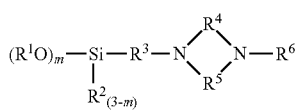

(1)

wherein each of $R^1$ and $R^2$ independently represents an alkyl group having 1 to 20 carbon atoms, or an aryl group; $R^3$ represents an alkylene group having 1 to 20 carbon atoms; $R^4$ and $R^5$, may be identical or different from each other, represent a hydrocarbon group having 1 to 6 carbon atoms, and form a 5 or more-membered ring structure together with two adjacent N; $R^6$ represents a hydrocarbon group having 1 to 20 carbon atoms, a hydrocarbon group substituted with a heteroatom having no active hydrogen and having 1 to 20 carbon atoms, or a triorgano-substituted silyl group; and m is an integer of 2 or 3, or, by the following formula (2):

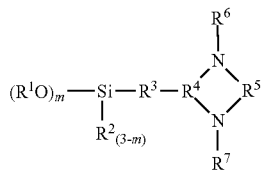

(2)

wherein the definitions of $R^1$ to $R^6$ and m are the same as in the formula (1) described above; and $R^7$ represents a hydrocarbon group having 1 to 20 carbon atoms, a hydrocarbon group which may be substituted with a heteroatom having no active hydrogen and having 1 to 20 carbon atoms, or a triorgano-substituted silyl group.

5. A modified conjugated diene-based polymer, wherein in gel permeation chromatography measurement using a polystyrenic gel-packed column, the peak area on the lowest molecular weight side accounts for 20 to 50% of an area of a whole chromatogram; and a modification ratio determined by an amount adsorbed onto a column used in gel permeation chromatography measurement using a silica particle-packed column is 78% by mass or more.

6. A method for producing a modified conjugated diene-based polymer, comprising the steps of:

reacting a polyvinyl aromatic compound with an organolithium compound to prepare a polyfunctional anionic polymerization initiator in a range of a molar ratio of the polyvinyl aromatic compound to the organolithium compound of from 0.05 to 1.0;

polymerizing a conjugated diene compound, or copolymerizing a conjugated diene compound with an aromatic vinyl compound by using the polyfunctional anionic polymerization initiator, so as to obtain a conjugated diene-based polymer; and reacting a living polymer end of the conjugated diene-based polymer with a compound having a silyl group substituted with two or more alkoxy groups, and one or more nitrogen atoms.

7. The method for producing the modified conjugated diene-based polymer according to claim 6, wherein a molar ratio of the polyvinyl aromatic compound to the organolithium compound is in a range of from 0.1 to 0.45.

8. The method for producing the modified conjugated diene-based polymer according to claim 6, wherein the compound having a silyl group substituted with two or more alkoxy groups, and one or more nitrogen atoms is represented by the following formula (1):

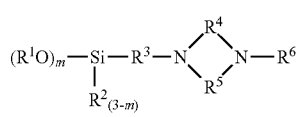

(1)

wherein each of $R^1$ and $R^2$ independently represents an alkyl group having 1 to 20 carbon atoms, or an aryl group; $R^3$ represents an alkylene group having 1 to 20 carbon atoms; $R^4$ and $R^5$, may be identical or different from each other, represent a hydrocarbon group having 1 to 6 carbon atoms, and form a 5 or more-membered ring structure together with two adjacent N; $R^6$ represents a hydrocarbon group having 1 to 20 carbon atoms, a hydrocarbon group substituted with a heteroatom having no active hydrogen and having 1 to 20 carbon atoms, or a triorgano-substituted silyl group; and m is an integer of 2 or 3, or, by the following formula (2):

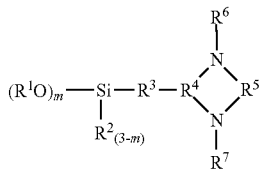

(2)

wherein the definitions of $R^1$ to $R^6$ and m are the same as in the formula (1) described above; and $R^7$ represents a hydrocarbon group having 1 to 20 carbon atoms, a hydrocarbon group which may be substituted with a heteroatom having no active hydrogen and having 1 to 20 carbon atoms, or a triorgano-substituted silyl group.

9. A modified conjugated diene-based polymer composition, comprising 0.5 to 300 parts by mass of a silica-based inorganic filler with respect to 100 parts by mass of a rubber component comprising 20 parts by mass or more of the modified conjugated diene-based polymer according to claim 1.

10. The modified conjugated diene-based polymer composition according to claim 9, further comprising 0.5 to 100 parts by mass of carbon black with respect to 100 parts by mass of the rubber component comprising 20 parts by mass or more of the modified conjugated diene-based polymer.

11. The modified conjugated diene-based polymer composition according to claim 9, wherein the silica-based inorganic filler has a nitrogen adsorption specific surface area of 170 m$^2$/g or more.

12. A tire comprising the modified conjugated diene-based polymer composition according to claim 9.

13. The modified conjugated diene-based polymer according to claim 2, wherein a molar ratio of the polyvinyl aromatic compound to the organolithium compound is in a range of from 0.1 to 0.45.

14. The modified conjugated diene-based polymer according to claim 2, wherein the compound having the silyl group substituted with two or more alkoxy groups, and one or more nitrogen atoms is represented by the following formula (1):

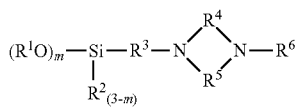

(1)

wherein each of $R^1$ and $R^2$ independently represents an alkyl group having 1 to 20 carbon atoms, or an aryl group; $R^3$ represents an alkylene group having 1 to 20 carbon atoms; $R^4$ and $R^5$, may be identical or different from each other, represent a hydrocarbon group having 1 to 6 carbon atoms, and form a 5 or more-membered ring structure together with two adjacent N; $R^6$ represents a hydrocarbon group having 1 to 20 carbon atoms, a hydrocarbon group substituted with a heteroatom having no active hydrogen and having 1 to 20 carbon atoms, or a triorgano-substituted silyl group; and m is an integer of 2 or 3, or, by the following formula (2):

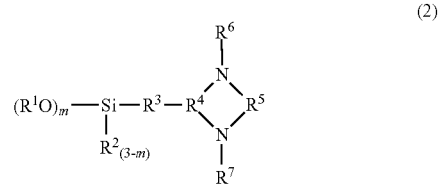

(2)

wherein the definitions of $R^1$ to $R^6$ and m are the same as in the formula (1) described above; and $R^7$ represents a hydrocarbon group having 1 to 20 carbon atoms, a hydrocarbon group which may be substituted with a heteroatom having no active hydrogen and having 1 to 20 carbon atoms, or a triorgano-substituted silyl group.

15. The method for producing the modified conjugated diene-based polymer according to claim 7, wherein the compound having a silyl group substituted with two or more alkoxy groups, and one or more nitrogen atoms is represented by the following formula (1):

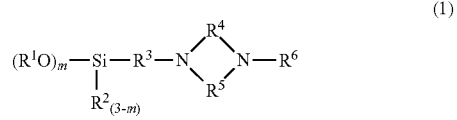

(1)

wherein each of $R^1$ and $R^2$ independently represents an alkyl group having 1 to 20 carbon atoms, or an aryl group; $R^3$ represents an alkylene group having 1 to 20 carbon atoms; $R^4$ and $R^5$, may be identical or different from each other, represent a hydrocarbon group having 1 to 6 carbon atoms, and form a 5 or more-membered ring structure together with two adjacent N; $R^6$ represents a hydrocarbon group having 1 to 20 carbon atoms, a hydrocarbon group substituted with a heteroatom having no active hydrogen and having 1 to 20 carbon atoms, or a triorgano-substituted silyl group; and m is an integer of 2 or 3, or, by the following formula (2):

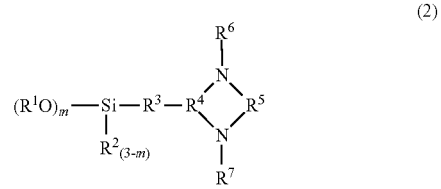

(2)

wherein the definitions of $R^1$ to $R^6$ and m are the same as in the formula (1) described above; and $R^7$ represents a hydrocarbon group having 1 to 20 carbon atoms, a hydrocarbon group which may be substituted with a heteroatom having no active hydrogen and having 1 to 20 carbon atoms, or a triorgano-substituted silyl group.

16. A modified conjugated diene-based polymer composition, comprising 0.5 to 300 parts by mass of a silica-based inorganic filler with respect to 100 parts by mass of a rubber component comprising 20 parts by mass or more of the modified conjugated diene-based polymer according to claim 2.

17. The modified conjugated diene-based polymer composition according to claim 16, further comprising 0.5 to 100 parts by mass of carbon black with respect to 100 parts by mass of the rubber component comprising 20 parts by mass or more of the modified conjugated diene-based polymer.

18. The modified conjugated diene-based polymer composition according to claim 16, wherein the silica-based inorganic filler has a nitrogen adsorption specific surface area of 170 m$^2$/g or more.

19. A tire comprising the modified conjugated diene-based polymer composition according to claim 16.

* * * * *